(12) United States Patent
Sakamoto et al.

(10) Patent No.: US 9,093,717 B2
(45) Date of Patent: Jul. 28, 2015

(54) METHODS OF MAKING AND USING OXIDE CERAMIC SOLIDS AND PRODUCTS AND DEVICES RELATED THERETO

(75) Inventors: Jeffrey Sakamoto, East Lansing, MI (US); Ezhiyl Rangasamy, East Lansing, MI (US); Hyunjoong Kim, East Lansing, MI (US); Yunsung Kim, East Lansing, MI (US); Ryan Patrick Maloney, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 421 days.

(21) Appl. No.: 13/476,843

(22) Filed: May 21, 2012

(65) Prior Publication Data

US 2013/0344416 A1    Dec. 26, 2013

Related U.S. Application Data

(60) Provisional application No. 61/488,624, filed on May 20, 2011.

(51) Int. Cl.
*H01M 8/10* (2006.01)
*H01M 10/0562* (2010.01)
(Continued)

(52) U.S. Cl.
CPC ......... *H01M 10/0562* (2013.01); *C01G 25/006* (2013.01); *C04B 35/486* (2013.01); *C04B 35/624* (2013.01); *C04B 35/6261* (2013.01); *C04B 35/6263* (2013.01); *C04B 35/6268* (2013.01); *C04B 35/645* (2013.01); *H01M 4/134* (2013.01); *H01M 4/382* (2013.01);
(Continued)

(58) Field of Classification Search
CPC ... H01M 8/10; H01M 8/1246; H01M 8/1253; H01M 8/126
USPC .......................................... 429/495
See application file for complete search history.

(56) References Cited

U.S. PATENT DOCUMENTS 7,282,295 B2    10/2007  Visco et al.
2004/0099843 A1  5/2004  Costa et al.
(Continued)

FOREIGN PATENT DOCUMENTS

JP         6-219726 A    8/1994

OTHER PUBLICATIONS

International Search Report and Written Opinion received for PCT Patent Application No. PCT/US2012/046469, mailed on Jan. 31, 2013, 7 pages.
(Continued)

*Primary Examiner* — Jane Rhee
(74) *Attorney, Agent, or Firm* — Clark IP Law, PLC

(57) ABSTRACT

Various embodiments relate to a method comprising combining a chelating agent, one or more non-aqueous organic solvents and one or more metallic compounds to produce an oxide ceramic solid in a non-aqueous solution based reaction, wherein the oxide ceramic solid contains metal-oxygen-metal bonds. The oxide ceramic solid can comprise, for example, a gel or a powder. Various devices, including electrolyte interfaces and energy storage devices, are also provided. In one embodiment, the oxide ceramic solid is a cubic garnet having a nominal formula of $Li_7La_3Zr_2O_{12}$ (LLZO).

7 Claims, 14 Drawing Sheets
(1 of 14 Drawing Sheet(s) Filed in Color)

(51) Int. Cl.
| | |
|---|---|
| *H01M 10/052* | (2010.01) |
| *H01M 4/134* | (2010.01) |
| *H01M 4/38* | (2006.01) |
| *H01M 8/12* | (2006.01) |
| *C01G 25/00* | (2006.01) |
| *C04B 35/486* | (2006.01) |
| *C04B 35/624* | (2006.01) |
| *C04B 35/626* | (2006.01) |
| *C04B 35/645* | (2006.01) |

(52) U.S. Cl.
CPC .......... *H01M8/1246* (2013.01); *H01M 10/052* (2013.01); *C01P 2002/72* (2013.01); *C04B 2235/3203* (2013.01); *C04B 2235/3217* (2013.01); *C04B 2235/3227* (2013.01); *C04B 2235/441* (2013.01); *C04B 2235/764* (2013.01); *C04B 2235/77* (2013.01); *H01M 8/10* (2013.01); *Y02E 60/122* (2013.01); *Y02E 60/523* (2013.01); *Y02E 60/525* (2013.01)

(56) References Cited

U.S. PATENT DOCUMENTS

| | | |
|---|---|---|
| 2007/0167534 A1 | 7/2007 | Coronado et al. |
| 2010/0047696 A1 | 2/2010 | Yoshida et al. |
| 2010/0203383 A1 | 8/2010 | Weppner |
| 2011/0053001 A1 | 3/2011 | Babic et al. |
| 2011/0053002 A1* | 3/2011 | Yamamura et al. ........... 429/322 |
| 2014/0170350 A1 | 6/2014 | Sakamoto et al. |

OTHER PUBLICATIONS

Ginneken et al., "Synthesis, Characterisation and Applications of Silica Aerogels", 6th International Symposium on Supercritical Fluids, Versailles, Apr. 2003, pp. 28-30.

Kokal, I. et al., "Sol-gel synthesis and lithium ion conductivity of $Li_7La_3Zr_2O_{12}$ with garnet-related type structure", Solid State Ionics, 185(1), 5 pgs.

Janani, N. et al., "Synthesis of cubic $Li_7La_3Zr_2O_{12}$ by modified sol-gel process", Ionics, 17 (7), 6 pgs.

Kotobuki, Masashi et al., "Compatibility of $Li_7La_3Zr_2O_{12}$ Solid Electrolyte to All-Solid-State Battery Using Li Metal Anode", Journal of the Electrochemical Society, vol. 157, No. 10, (2010), A1076-A1079.

Wolfenstine, J. et al., "Electrical and Mechanical Properties of Hot-Pressed Versus Sintered $LiTi_2(PO_4)_3$", Solid State Ionics, vol. 180, (2009), 961-967.

Maloney, et al., "Large Deformation of Chlorotrimethylsilane Treated Silica Aerogels", Journal of Non-Crystalline Solids, vol. 357, Issue 10, May 1, 2011, pp. 2059-2062.

* cited by examiner

In Seawater (pH = 8.2): 2Li(s) + 2H$_2$O(l) = 2LiOH(l) + H$_2$(g)

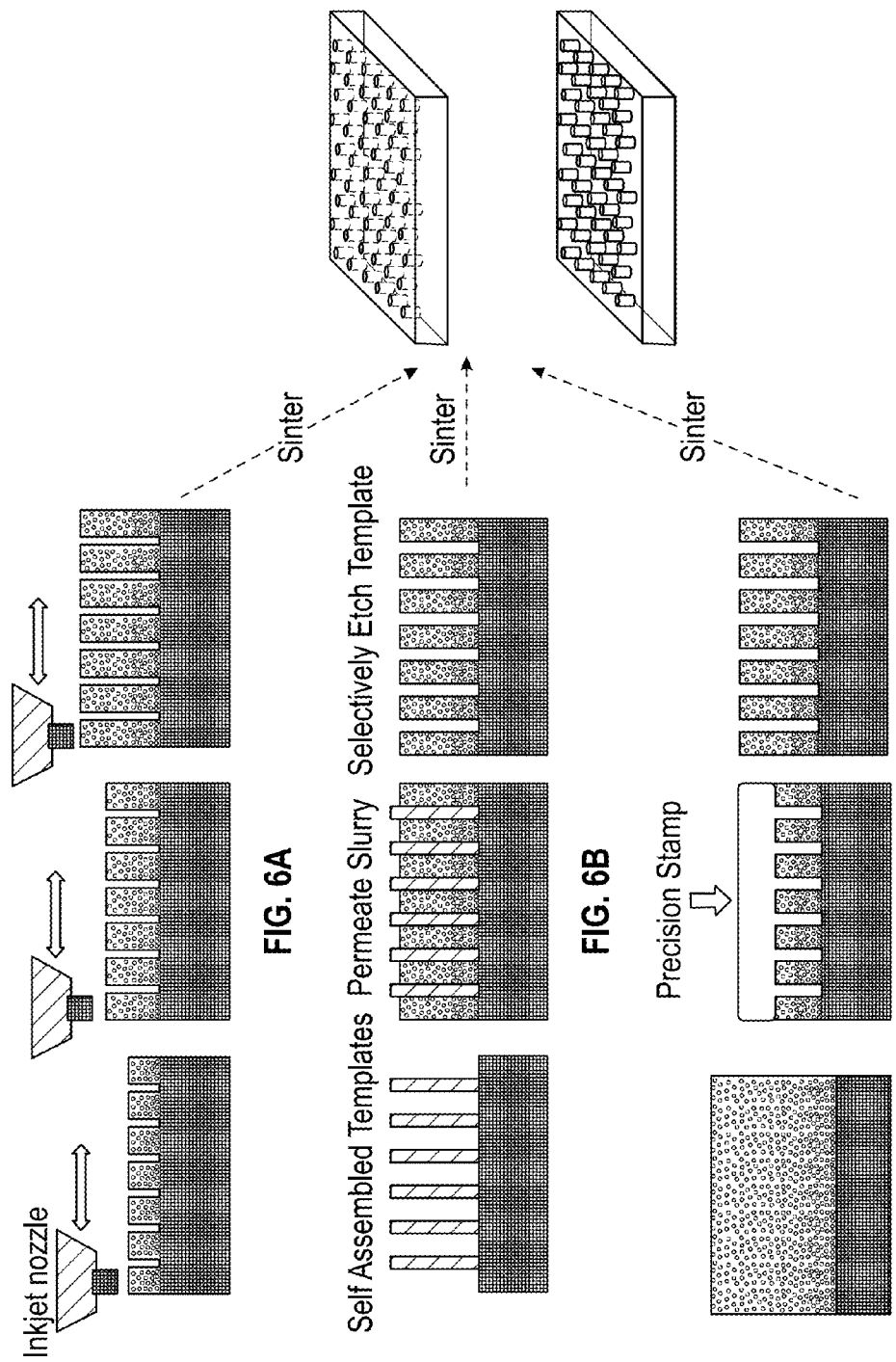

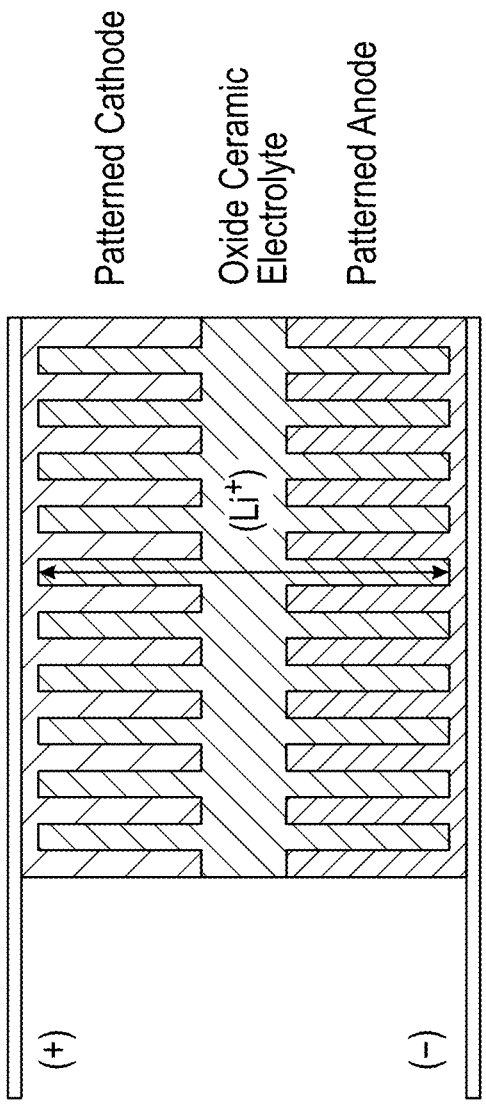
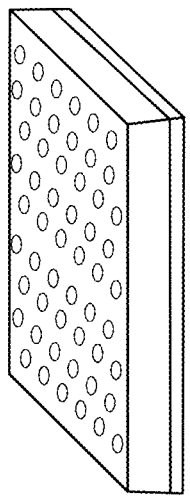
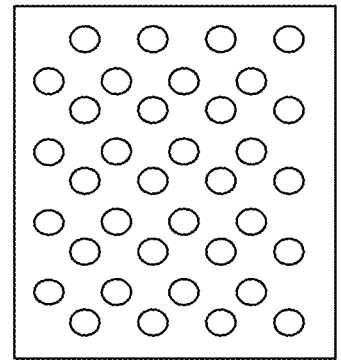
FIG. 8A
FIG. 8B
FIG. 8C
Patterned Cathode
Oxide Ceramic Electrolyte
Patterned Anode

METHODS OF MAKING AND USING OXIDE CERAMIC SOLIDS AND PRODUCTS AND DEVICES RELATED THERETO

This application claims the benefit under 35 U.S.C. 119 (e) of U.S. Provisional Application Ser. No. 61/488,624, filed on May 20, 2011, hereby incorporated by reference herein in its entirety.

STATEMENT OF GOVERNMENT RIGHTS

This invention was made with government support under W911NF-10-2-0089 and W911NF-09-1-0451 awarded by the U.S. Army Research Laboratory, and under DGE-0802267 awarded by the National Science Foundation. The government has certain rights in this invention.

BACKGROUND

Portable or independent energy sources have wide application in many areas of technology.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 6A illustrates a layer-by-layer inkjet deposition method for generating a high surface area interface in a solid oxide ceramic electrolyte membrane according to an embodiment.

FIG. 6B illustrates a patterning with self-assembled template method for generating a high surface area interface in a solid oxide ceramic electrolyte membrane according to an embodiment.

FIG. 6C illustrates a precision embossing method for generating a high surface area interface in a solid oxide ceramic electrolyte membrane according to an embodiment.

FIG. 8A illustrates a solid-state Li-ion battery employing a solid oxide ceramic electrolyte according to an embodiment.

FIG. 8B is a perspective view of the battery of FIG. 8A according to an embodiment.

FIG. 8C is a top view of the battery of FIG. 8A according to an embodiment.

DETAILED DESCRIPTION

Figure 1:
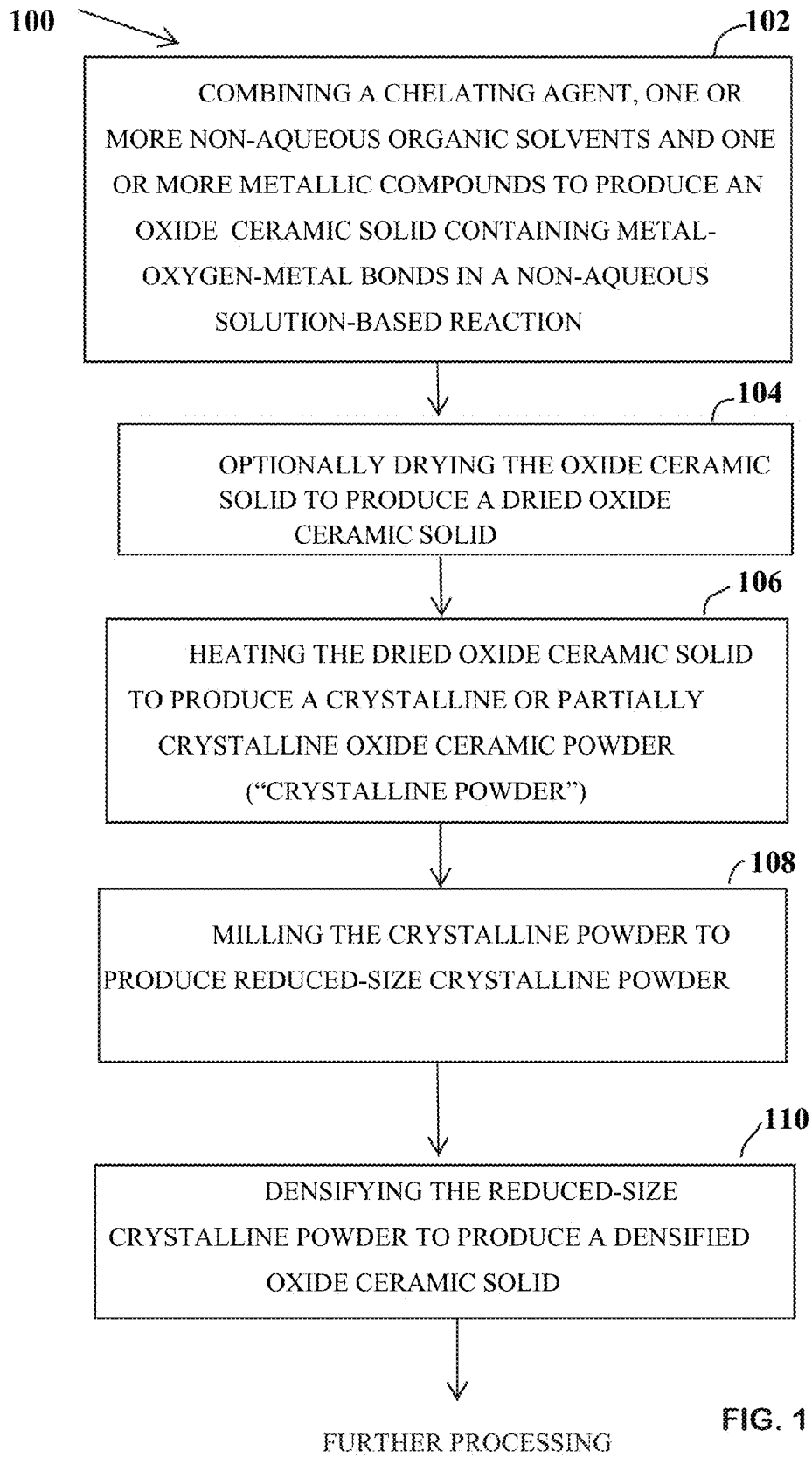
FIG. 1 is a process diagram for producing oxide ceramic solids according to an embodiment.

In the following detailed description of embodiments of the invention, embodiments are described in sufficient detail to enable those skilled in the art to practice them, and it is to be understood that other embodiments may be utilized and that chemical, structural and procedural changes may be made without departing from the spirit and scope of the present subject matter. The following detailed description is, therefore, not to be taken in a limiting sense, and the scope of embodiments of the present invention is defined only by the appended claims.

There is a need to develop materials and devices that allow for safe, high performance energy storage. Attempts to use various oxide ceramics for such purposes, however, have not been successful.

The various embodiments described herein provide for methods of making oxide ceramic solids having the desired properties and/or which can be further processed to have the desired properties, for use in a variety of products, including, for example, energy storage devices.

The term "oxide ceramic" or "oxide ceramic solid" as used herein refers to a non-organic metallic solid material that can contain one metallic element (single oxide) or two or more metallic elements (mixed oxide or complex oxide). Such materials may have a variety of compositions, porosities, and microstructures, to meet specific property requirements. Such materials may be crystalline (e.g., polycrystalline), partially crystalline or amorphous.

The term "oxide ceramic gel" as used herein refers to an oxide ceramic solid which is a colloidal suspension of oxide ceramic particles in a liquid medium.

The term "drying" as used herein refers to removal of a majority of liquid from a material, such as an oxide ceramic gel, to form a dried oxide ceramic gel. Trace amounts of liquid may remain in a material which has been dried.

The term "oxide ceramic powder" as used herein refers to a crystalline or partially crystalline oxide ceramic solid comprising one or more particles.

The term "oxide ceramic-forming agent" as used herein refers to a material capable of forming an oxide ceramic solid.

The term "non-aqueous solution-based reaction" as used herein refers to a solution-based reaction performed with non-aqueous solvents and no intentionally added water. A non-aqueous solution-based reaction includes a gelation reaction and a condensation reaction. The term "sol gel" has also been used to loosely refer to a non-aqueous solution-based reaction.

The term "gelation reaction" or "sol gel process" as used herein refers to a gelation portion of a non-aqueous solution-based reaction which can produce an oxide ceramic solid.

The term "condensation reaction" as used herein refers a condensation portion of a non-aqueous solution-based reaction which follows a gelation reaction. During a condensation reaction water is produced as a byproduct of forming metal-oxide-metal bonds.

The term "garnet" as used herein refers to the atomic structure of crystalline or partially crystalline oxide ceramic solid.

The term "cubic garnet" as used herein refers to a garnet having a substantially cubic shape. The space group for cubic garnet is Ia3d.

The term "LLZO" or $Li_7La_3Zr_2O_{12}$ as used herein refers to a cubic garnet having a nominal formula of $Li_7La_3Zr_2O_{12}$ in combination with a supervalent dopant.

The term "calcine" as used herein refers to heating a substance to a high temperature which is below the melting point, to produce a powder.

The term "chelating agent" as used herein refers to a chemical compound that coordinates with a metal to form a chelate. A chelating agent is a type of oxide ceramic-forming agent which can vary pH of a solution. As the term is used herein, a chelating agent is also intended to refer to an agent that can regulate the rate of hydrolysis and condensation.

The term "electrochemical cell" as used herein refers to a device capable of deriving electrical energy from chemical reactions, or capable of facilitating chemical reactions through the introduction of chemical energy.

The term "electrode" as used herein refers to an electrochemical electrode, and can also refer to either an anode or a cathode. An anode generally refers to the electrode at which electrons leave the cell and oxidation occurs, and a cathode generally refers to the electrode at which electrodes enter the cell and reduction occurs during discharge. In some examples of an electrochemical cell, each electrode can become either the anode or the cathode depending on the direction of current through the cell.

The term "ordered electrode" as used herein refers to an electrode having non-random porosity.

The term "highly ordered electrode" as used herein refers to an electrode having non-random porosity, with the pores of substantially the same size, geometry, and orientation, with a periodic arrangement.

The term "battery" as used herein refers to one or more electrochemical cells which convert stored chemical energy into electrical energy. The term can refer to primary batteries (generally one use, disposable), or secondary batteries (rechargeable).

The term "fuel cell" as used herein refers to one or more electrochemical cells, each having an anode and a cathode, which convert chemical energy from fuel into electric energy. Reactants flow into the cell, and reaction products flow out of the cell.

The term "semi-fuel cell" as used herein refers to a device that is generally part fuel cell and part battery.

The term "electrolyte" as used herein refers to any substance that conducts ions with minimal or no conduction of electrons. In a fuel cell, battery, or semi-fuel cell, one or more electrolytes can separate the anode and cathode, and can allow the conduction of ions from one half-cell to another half-cell.

The term "interconnected porosity" as used herein refers to an undesirable feature in an energy storage device in which the electrolyte is so porous that dendrites (i.e., tree-like structure of crystals) in the electrolyte can penetrate the membrane of the electrolyte and cause ions to permeate from the anode to cathode and vice versa. Interconnected porosity is typically not present when the theoretical (i.e., calculated) density is greater than 90%.

The term "ink jet printing" as used herein refers to any of a variety of methods that allow the deposition of small droplets of material on a substrate via ejection of the material from a printing head. In one example, ink jet printing includes a print head with a series of small chambers filled with material. In order to cause a droplet of material to emanate from a chamber to be deposited on a substrate, heat can be applied to the chamber, causing evaporation of volatile components of the material, and ejecting the material from the chamber. Another method of causing a droplet of material to emanate from the chamber to be deposited on a substrate includes rapidly decreasing the volume of a chamber, for example with the use of a piezoelectric crystal, causing ejection of the material from the chamber.

There is a need to develop materials and apparatus that allow for safe, high performance energy storage. Attempts to make and use various oxide ceramic materials for such purposes, however, have heretofore not provided the desired results.

For example, titanium-containing inorganic electrolytes with the NASICON-type lithium ion conducting solid $Li_{1+x+y}Al_xTi_{2-x}Si_yP_{3-y}O_{12}$ (LATP) and perovskite-type $Li_{3x}La_{2/3-x}TiO_3$ (LLTO) structures are not stable in contact with lithium (Li). Attempts to overcome this issue include integrating organic electrolytes or LIPON electrolytes with the titanium electrolytes. The additional electrolyte layers, however, increase complexity, and diminish durability and performance.

Current synthetic methods of making oxide ceramic solids are only capable of making a gel network using organic complexes or molecules to link cations together. The resulting oxide ceramic gel contains metal-organic-metal bonds. One such method is the Pechini process described, for example, in "Ceramics Science and Technology" edited by R. Riedel. Sec. 11.2.2.5-11.2.3.1. The Pechini process is an aqueous organic polymerization process in which chelated metal cations react with a polyhydroxyalcohol (such as ethylene glycol) to form organic ester compounds. Essentially, the polydroxyalcohol and other components form a polymeric resin which entraps dissolved cations in nitric acid. As noted above, and given the lack of use of a chelating agent, no metal-organic-metal bonds are formed in these processes. Additionally, some prior art processes do not use a supervalent cation. This results in a densified material that is unable to form into a cubic phase and instead, can transform into the tetragonal phase during sintering.

Yet other methods require exposure to oxygen and solvent vapors to enable curing of the reaction product. Yet other solution-based methods utilize a citrate process that is also only capable of making a gel network using organic complexes or molecules to link the cations together.

In contrast, the embodiments described herein encompass s methods for making oxide ceramic solids using a non-aqueous solution-based reaction (hereinafter "gel/condensation process") comprising a gelation portion and a condensation portion. The resulting solids contain metal-oxygen-metal bonds rather than metal-organic-metal bonds as in the prior art. In one embodiment, oxide ceramic solids are produced using carbon levels which are less than 7 at %. In one embodiment, inorganic polymerization can occur during a gel/condensation process.

The gel/condensation process as a whole, and each portion thereof, can be performed at any suitable temperature, such as, for example, room temperature (i.e., ambient temperatures), or a few degrees above or below room temperature. In one embodiment, the gel/condensation process can be performed at any temperature between the freezing and boiling points of the non-aqueous solvents used. In one embodiment, the gel/condensation process is performed at from about −15 to about 50° C. In one embodiment, the gelation reaction and the condensation reaction are performed at about the same temperatures. In on embodiment, the gelation reaction and condensation reaction are performed at different temperatures.

In most embodiments, a stabilizing agent, such as at least one supervalent cation, is added to the solution during the gelation portion of the gel/condensation process. During the condensation portion of the gel/condensation process, a condensation reaction occurs, with one or more metal compounds (e.g., alkoxide precursor) and a chelating agent producing ceramic solids containing metal-oxide bonds. Upon drying, crystalline and/or partially crystalline oxide ceramic solids can be formed.

In one embodiment, the supervalent cation is selected from Al, Ta, Ga, Nb, Ce or combinations thereof, in any suitable concentration. In one embodiment, the concentration of the supervalent cation is between about 0.1 and 1 mole, including any range there between. In one embodiment, the metal compound is an alkoxide precursor.

In one embodiment, the chelating agent controls pH and can also slow down the condensation reaction, thus preventing or reducing inhomogeneous precipitation of dissolved salts and enabling molecular level mixing. In one embodiment, the chelating agent additionally or alternatively improves the stability of the resulting oxide ceramic solid by, for example, reducing the % volume shrinkage during drying. As a result, casting techniques, such as spin coating and drop casting can be used with the oxide ceramic solids produced according to the methods described herein.

In one embodiment, prior to being dried, such as with heating and/or by exposure to room temperatures for a period of time, the oxide ceramic solids resulting from the sol/condensation process are primarily amorphous with nanometer-scale crystallites. In one embodiment, the oxide ceramic solids at this stage are at least 90% amorphous or higher, such as at least 95% amorphous. Upon application of heat (e.g., between about 550 and 650° C., such as between about 590 and about 610° C.), the amorphous volume fraction is reduced.

Figure 11:
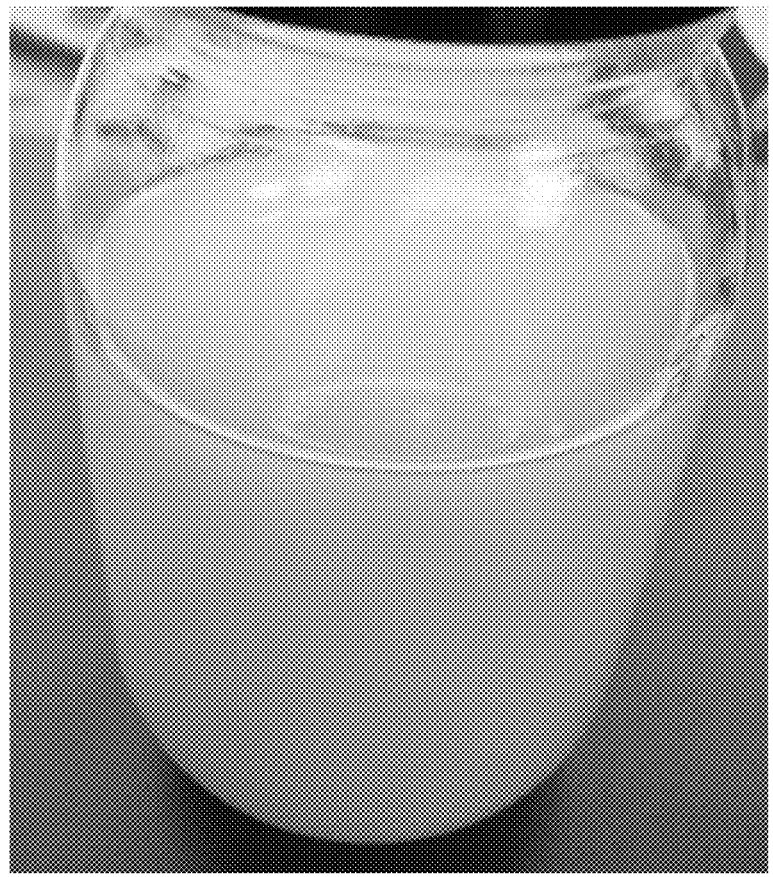
FIG. 11 is an image of a $Li_7La_3Zr_2O_{12}$(LLZO) gel made according to the method described in Example 5 according to an embodiment.

As noted above, the resulting oxide ceramic solids also contain metal-oxygen bonds, rather than metal-organic-metal bonds (i.e., organic cross-links) as in prior art processes (e.g., Pechini process), and are substantially transparent or otherwise have a white or light-colored appearance (See FIG. 11). In the novel methods described herein, this appearance is possible even without the use of oxidation. This is in contrast to prior art processes which form brown colored products which do not have metallic-oxide bonds.

While not wishing to be bound by this proposed theory, it is likely that the oxide ceramic solid formed during the gel/condensation process is formed when a metallic cation (e.g., zirconia cation) forms a metallic oxide or metallic hydroxide solid network after condensation, to which other cations can bond and/or become immobilized therein during drying.

In one embodiment, the method can optionally include drying the oxide ceramic solid at room temperature to form a dried oxide ceramic solid. Drying the oxide ceramic solid at room temperature can remove the majority of the solvents contained therein. High boiling solvents, such as DMF, may take a relatively long time to dry at room temperature, i.e., more than one day. In some embodiments, only lower boiling non-aqueous organic solvents are removed via drying at room temperature.

An oxide ceramic solid or a dried oxide ceramic solid can be further processed in a non-oxidizing environment to produce crystalline or partially crystalline oxide ceramic powders. If desired, however, the processing or a portion of the processing can instead take place in an oxidizing environment.

The additional processing of the oxide ceramic solid or dried oxide ceramic solid can include, for example, a "pre-heating" step, which is not only useful for removing the majority of any solvent that remains after a room temperature drying step, but which can be useful as a stand-alone treatment to produce crystalline or partially crystalline oxide ceramic powder or otherwise can be used prior to subsequent processing.

As such, the oxide ceramic solid can be further processed at any suitable temperature adapted to produce the desired results. In one embodiment the oxide ceramic solid or dried oxide ceramic solid is exposed to elevated temperatures for a suitable period of time, such as between about 650 and about 1200° C., including any range there between, although the embodiments are not so limited. In one embodiment, the time period is between about 1 minute and about 5 hours, including any range there between. In one embodiment, the time period is between about 1 hour and about 3 hours, including any range there between.

In one embodiment, the oxide ceramic solid or dried oxide ceramic solid is exposed to a temperature sufficiently elevated to allow for adequate densification to occur during a subsequent densification process. In one embodiment, the oxide ceramic solid is heated to a temperature of at least 1000° C.

In one embodiment, pre-heating the oxide ceramic solid produces a heated oxide ceramic solid. In one embodiment, pre-heating the oxide ceramic solid can additionally or alternatively produce oxide ceramic powder particles.

The resulting heated oxide ceramic solid and/or oxide ceramic powder particles can optionally be further processed by any desired means. In one embodiment, the milling process includes, but is not limited to, ball milling, tumbler milling, mixer milling, planetary milling, and/or high energy milling. The milling can occur for any suitable time period sufficient to sufficiently mill the powder, including, for example, about 1 minute, 2 minutes, 3 minutes, 4 minutes, 5 minutes, 10 minutes, or more, such as for about 20 minutes, including any range there between. The milling can be at low energy (e.g., mortar and pestle) and at room temperature. Use of milder conditions can help to avoid or reduce undesirable results, such as chemical contamination from the mill. In other embodiments, the milling can be at high energy. High energy milling can be performed at high temperatures, such as no less than about 100° C. High energy milling can cause an increase in temperature of the powder. In one embodiment, it is a combination of pre-heating and milling that produces the oxide ceramic powder particles. In one embodiment, milling of the heated oxide ceramic solid produces the oxide ceramic powder particles.

The resulting milled oxide ceramic powder particles can be densified in any suitable manner, such as with pressing or heating (i.e., heat-treating) or a combination thereof, either simultaneously or sequentially. The powder particles can be pressed into any suitable shape, such as, for example, a wafer, pellet, puck, or disk. Pressing can occur in any suitable environment, including, for example, in inert gas (e.g., argon) or ambient air. The pressing can occur at any suitable pressure, including, for example, about 10 MPa to about 200 MPa, including any range there between. In one embodiment, the pressing can occur at a pressure of at least 80 MPa. The pressing can occur at any suitable temperature, and, as noted above, can be simultaneous with heat-treating. In one embodiment, the pressing and/or heat treating can occur at a temperature of between about 800° C. and about 1200° C. or at about 900° C. to about 1100° C., including any range there between. In another example, the pressing can occur at a temperature of at least about 1000° C.

In one embodiment, pre-calcined LLZO powder is exposed to temperatures of greater than 650° C. and pressed at a pressure of greater than 10 MPa to produce an oxide ceramic solid having substantially no interconnected porosity (>90% theoretical density). As such, in one embodiment, the resulting cast films are sufficiently non-porous such that they can, in one embodiment, be used as is, without first heating, although heating remains a viable option. In one embodiment, use of elevated temperatures allows for production of nano-sized oxide solids.

In one embodiment, the crystalline or partially crystalline oxide ceramic solids formed with the sol/condensation process comprise a cubic garnet with the space group Ia3d or tetraganol garnet with the space group I4$_1$/acd. However, it is possible that tetragonal garnet may have less conductivity as compared with a cubic garnet. In one embodiment, the oxide ceramic solid contains lithium. The sites specific to lithium are 24d, 48g and 96h.

In one embodiment, the oxide ceramic solid is a cubic garnet having a formula of $A_xR_yC_zS_aO_{12}$ wherein "A" can be a cationic species such as, but not limited to, H, Li, Na, Mg, Al, Sc and/or Ga. The "A" cationic species can reside in an 8a, 16f, 32g, 24d, 48g or 96h site. "R" can be a cationic species such as, but not limited to, La, Ba and/or Ce. The "R" cationic species can reside in the 24c site. "C" can be a cation species such as, but not limited to, Zr, Ta, Nb, Y and/or Hf. The "C" cationic species can reside in the 16a site.

In one embodiment, the oxide ceramic solid is a cubic oxide ceramic solid, such as $Li_7La_3Zr_2O_{12}$. In one embodiment, the $Li_7La_3Zr_2O_{12}$ has an ionic conductivity of at least $3.9 \times 10^{-4}$ S/cm. In one embodiment, the $Li_7La_3Zr_2O_{12}$ is at least 90% dense or more, such as between about 90% and about 95% or about 90% and about 97.6% dense, including any range there between. In one embodiment, the $Li_7La_3Zr_2O_{12}$ is at least about 97.6% dense. In one embodiment, aluminum is used to help the oxide ceramic solid form in a cubic phase. In some embodiments, aluminum can be added to the solutions and/or to the solid (gel and/or powder) in powder form during heating or pre-heating steps, or a combination thereof. For example, see "E. Rangasamy, J. Wolfenstine and J. Sakamoto, The role of Al and Li concentration on the formation of cubic garnet solid electrolyte of nominal composition $Li_7La_3Zr_2O_{12}$, Solid State Ionics, 206, 28-32 (2011).

The aluminum compound can include, for example, an aluminum oxide, aluminum salt, or organoaluminum compound. In one embodiment, the aluminum compound can include $Al_2O_3$, $Al(NO_3)_3 \cdot 9H_2O$, $Al(OH)_3$, aluminum, aluminum acetylacetonate, aluminum triethoxide, aluminum butoxide, aluminum propoxide, aluminum methoxide, aluminum chloride, aluminum chloride hexahydrate, diethylaluminum chloride, aluminum oleate, aluminum acetate n-hydrate, aluminum oxalate, aluminum bromide, aluminum stearate, triethyl aluminum, trimethyl aluminum, triisobutyl aluminum, aluminum sulfate, aluminum iodide, and/or any aluminum salt of an organic or mineral acid. In one embodiment, the aluminum compound can include aluminum oxide ($Al_2O_3$).

The embodiment in FIG. 1 comprises a sol/condensation process 100 for producing a crystalline or partially crystalline oxide ceramic solid by combining 102 a chelating agent, one or more non-aqueous organic solvents and one or more metallic compounds to produce an oxide ceramic solid containing metal-oxygen-metal bonds. The method can further comprise drying 104 the oxide ceramic solid to produce a dried oxide ceramic solid, heating 106 the dried oxide ceramic solid to produce a crystalline or partially crystalline oxide ceramic powder (hereinafter "crystalline ceramic powder"), milling 108 the crystalline powder to produce reduced-sized crystalline ceramic powder, and densifying 112 the oxide ceramic powder to produce a densified oxide ceramic solid which can be further processed, cast, etc., for use in various devices, such as energy storing devices.

Figure 2:
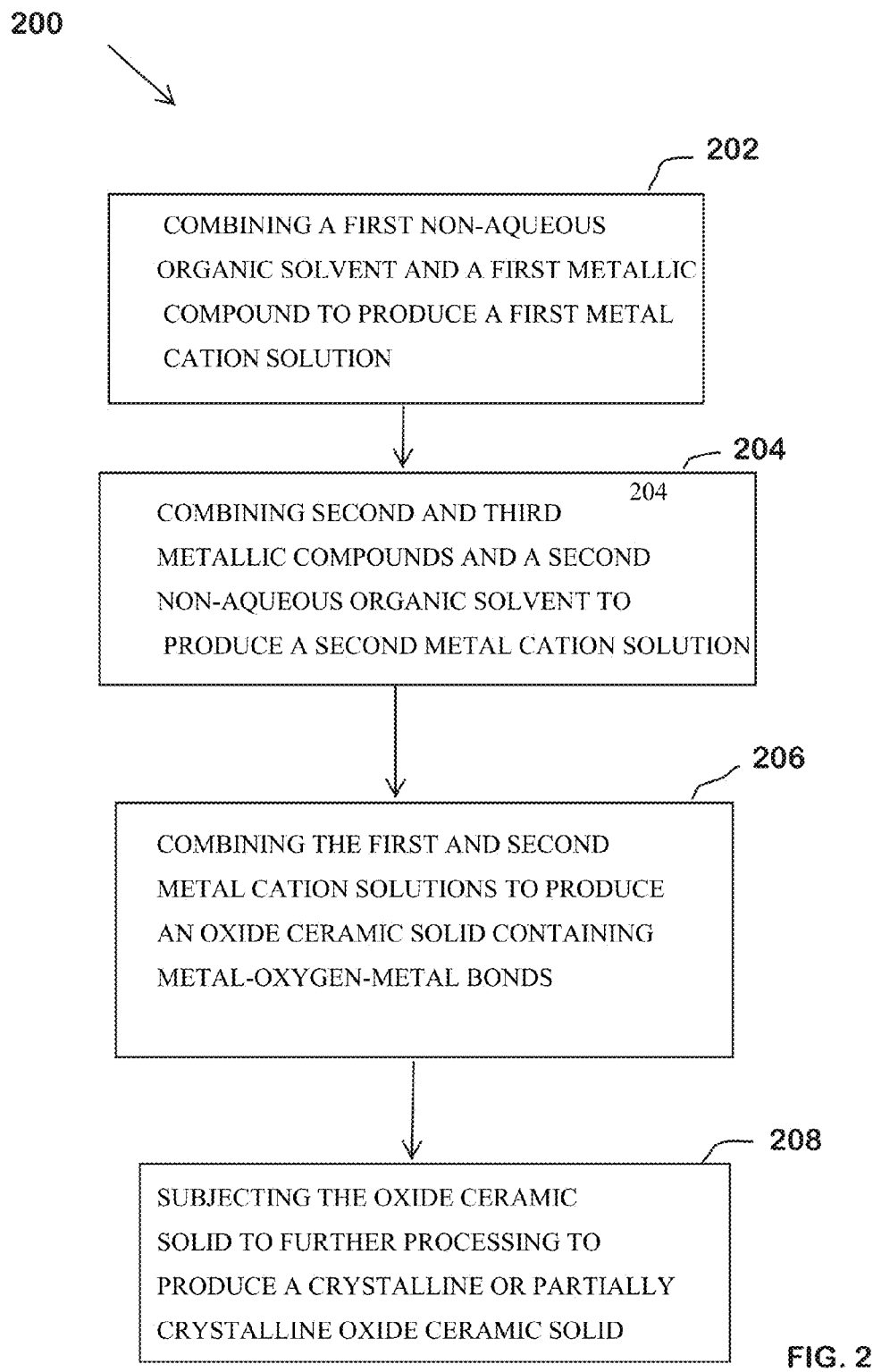
FIG. 2 is a process flow diagram for producing oxide ceramic solids according to an embodiment.

In one embodiment, as shown in FIG. 2, a non-aqueous sol/condensation process 200 is provided for producing a crystalline or partially crystalline oxide ceramic solid by combining 202 a first non-aqueous organic solvent and a first metallic compound to produce a first metal cation solution. The method further includes combining 204 second and third metallic compounds and a second non-aqueous organic solvent to produce a second metal cation solution. The method further includes combining 206 the first and second metal cation solution solutions to produce an oxide ceramic solid containing metal-oxygen-metal bonds. The method can further comprise optionally subjecting 208 the oxide ceramic solid (e.g., gel) to further processing to produce a dried oxide ceramic solid, an oxide ceramic powder, a densified oxide ceramic powder, and so forth. In one embodiment, the first metallic compound is a zirconium compound, the second metallic compound is a lanthanum compound, the third metallic compound is a lithium compound and the metallic solid is a lithium-lanthanum-zirconate gel.

In one embodiment, the first and second non-aqueous organic solvents of FIG. 2 comprise mixtures of more than one non-aqueous organic solvent. In one embodiment, the first and second non-aqueous organic solvents are the same. Suitable non-aqueous organic solvents can include any non-aqueous organic solvent that can dissolve the metallic compounds. In one embodiment, the non-aqueous organic solvents are selected from protic, aprotic, or dipolar aprotic non-aqueous organic solvents which can include, but are not limited to, aromatic hydrocarbons, aliphatic hydrocarbons, alcohols (e.g., n-propanol, methanol), aldehydes, haloforms, ketones, amines, amides (e.g., N,N-dimethylformamide), esters, ethers, glycol (other than ethylene glycol), alkyl halides and/or aromatic halides.

Any suitable number of metallic compounds can be combined. In one embodiment, one metallic compound is used. In one embodiment, at least two metallic compounds are used. In one embodiment, three or more metallic compounds are used. In one embodiment a lithium compound, a lanthanum compound and/or a zirconium compound are used.

In one embodiment, three different metallic compounds are used. In this embodiment, a zirconium compound can be used as a first, second and/or third metallic compound. In one embodiment, the zirconium compound is selected from organozirconium compounds, zirconium alkoxides (e.g., zirconium n-propoxide, zirconium n-butoxide, zirconium t-butoxide, zirconium ethoxide), zirconium tetrahydrates, zirconium carbonates, zirconium silicates, zirconium acetates, zirconium halides, zirconacene compounds, and/or a zirconium salts of an organic and/or a mineral acid (e.g., zirconium sulfate.

In the embodiment in which three different metallic compounds are used, a lanthanum compound can be used as a first, second and/or third metallic compound. In one embodiment, the lanthanum compound is selected from organolanthanum compounds, lanthanum alkoxides (e.g., lanthanum ethoxide, lanthanum isopropoxide), lanthanum sulfates, lanthanum hexahydrates, lanthanum halide (e.g., lanthanum bromide, lanthanum chloride, etc.), lanthanum nitrates (e.g., lanthanum nitrate hexahydrate), lanthanum oxalates and/or lanthanum salts of an organic and/or a mineral acid.

In the embodiment in which three different metallic compounds are used, a lithium compound can be used as a first, second and/or third metallic compound. In one embodiment, the lithium compound is selected from organolithium compounds, lithium oxides (e.g., lithium t-butoxide, lithium alkoxide), lithium acetates (e.g., lithium acetate dehydrate), lithium hydroxides, lithium halides (e.g., lithium bromide), lithium hydrides (lithium borohydride, lithium iodide, etc.) lithium nitrates (e.g., lithium nitrate hydrate), lanthanum oxalates and/or lithium salts of an organic and/or a mineral acid.

In generating the oxide ceramic solid, the mole ratios of the metals, such as lithium, lanthanum, and zirconium in the starting materials (with respect to the total number of moles of the metals in the starting materials) can be the same or different than the mole ratios of the metals in the oxide ceramic solid produced. In one embodiment, the mole percent of the first metal (e.g., lithium) can be between about 40% to about 70%, about 50% to about 62%, or about 54% to about 58% (with respect to the total number of moles of all metals in the starting materials), including any range there between. In one embodiment, the mole percent of the second metal (e.g., lanthanum) in the starting materials can be between about 10% to about 40%, about 18% to about 30%, or about 22% to about 26% (with respect to the total number of moles of all metals in the starting materials), including any range there between. In one embodiment, the mole percent of the third metal (e.g., zirconium) can be between about 5% to about 35%, about 13% to about 27%, or about 18% to about 22% (with respect to the total number of moles of all metals in the starting materials), including any range there between.

The chelating agent can be any suitable chelating agent capable of functioning as an oxide ceramic-forming agent, which not only coordinates with a metal to form a chelate, but also, in the process, varies the pH of a solution and regulate the rate of hydrolysis and condensation. In one embodiment, the chelating agent is an organic acid (e.g., acetic acid, nitric acid, citric acid), mineral acid, and or amine (e.g., triethanolamine).

The chelating agent and the non-aqueous organic solvent (e.g., first non-aqueous organic solvent) can be stirred together prior to combining the first metallic compound. The stirring can occur for any suitable amount of time to allow for sufficient mixing, such as for about 1 minute to about 20 minutes, including any range there between, prior to combining the first metallic compound. In embodiments in which more than one metallic compound is used, or in which one or more metallic compounds are added simultaneously or sequentially, after addition of the first metallic compound, the solution can be stirred for any suitable amount of time prior to combining with the second metallic solution to allow for sufficient mixing, such as about 5 minutes to about 40 minutes, including any range there between, prior to combining with the second metallic compound. In one embodiment, the first metallic compound is zirconium and the second metallic compound is a combination of lithium and lanthanum in any suitable proportions.

The lanthanum compound and the non-aqueous organic solvent (e.g., second non-aqueous organic solvent) can be stirred together prior to combining the second metallic compound. The stirring can occur for any suitable amount of time, such as for about 1 minute to about 20 minutes, including any range there between, prior to combining the second metallic compound. After addition of the second compound, the solution can be stirred prior to combining with the first metallic solution. The stirring can occur for any suitable amount of time, such as, for about 5 minutes to about 1 hour, including any range there between, prior to combining with the first metallic solution.

The combination of the first and second metallic solutions can occur in any suitable manner. For example, the combination can occur in a slow manner, such as dropwise.

Methods of using oxide ceramic solids, such as gels and powders, are also provided herein, as well as devices and interfaces related thereto. In one embodiment, a thin film having a thickness of less than 1 micron can be produced from the oxide ceramic solids described herein.

Various embodiments provide batteries, fuel cells, and semi-fuel cells that include the oxide ceramic garnets, such as cubic phase LLZO having a nominal formula of $Li_7La_3Zr_2O_{12}$ (which can include a supervalent cation to stabilize the cubic phase) made by the methods described herein. Some embodiments provide methods of making batteries, fuel cells, and semi-fuel cells that include the method of making $Li_7La_3Zr_2O_{12}$ described herein. The cubic phase $Li_7La_3Zr_2O_{12}$ can be included in the electrolyte of the battery, fuel cell, or semi-fuel cell. The battery, fuel cell, or semi-fuel cell can be solid-state.

Figure 3:
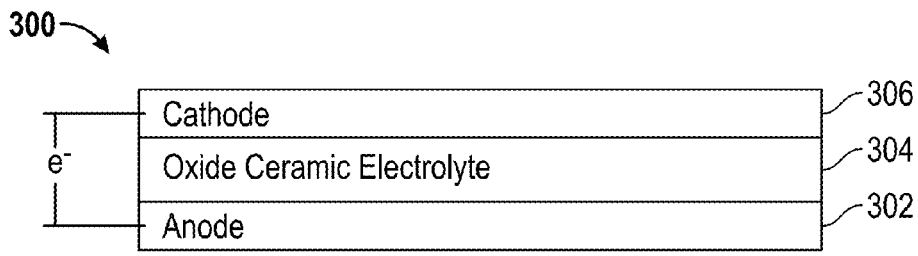
FIG. 3 illustrates a cell employing a solid oxide ceramic electrolyte according to an embodiment.

In one embodiment, a fuel cell is provided. An example fuel cell 300 is shown in FIG. 3. The embodiment shown in FIG. 3 can represent any suitable cell, including, but not limited to, include sulfur cells including batteries, including lithium-sulfur batteries and sodium-sulfur batteries.

In the embodiment shown in FIG. 3 the fuel cell 300 comprises at least one electrode which includes hydrogen, lithium, sodium, magnesium, aluminum or gallium In one embodiment, the fuel cell 300 comprises an anode layer 302 with an oxide ceramic electrolyte layer 304 stacked on top, and a cathode layer 306 stacked on top of the oxide ceramic electrolyte layer 304. In one embodiment, the anode layer 302 is comprised of any suitable anode material, including, but not limited to, carbon (e.g., boron doped carbon, graphite carbon, hard carbon, and/or soft carbon), metallic lithium, metal compounds, metal oxides (e.g., lithium metal oxides such as lithium transition metal complex oxides. In one embodiment, the anode layer 302 is an insertion/alloying-type of anode.

In this embodiment, the oxide ceramic electrolyte layer 304 is a solid layer comprised of an oxide ceramic compound. Use of a solid electrolyte layer rather than a liquid electrolyte layer eliminates the need for a polymer separator, such as a porous polymer separator, although such a layer can be used, if desired.

In one embodiment, the oxide ceramic compound is a lithium oxide compound which is stable when in contact with elements such as lithium, and compounds such as lithium phosphorous oxynitride (LiPON), without the need for an integrated electrolyte coating, although such a coating can be used, if desired. However, the ability to have direct contact with metallic anodes can reduce complexity of the semi-fuel cell, simplify assembly and improve durability and longevity of the fuel cell, as compared to fuel cells using electrolytes that are not stable in contact with elements such as lithium and compounds such as LiPON.

Use of metallic lithium as a component of the oxide ceramic compound can increase the capacity of an all-solid-state energy storage device as compared with a conventional liquid electrolyte.

In one embodiment, the oxide ceramic compound includes, but is not limited to, LiAl, LiZn, $Li_3Bi$, $Li_3Cd$, $Li_3Sd$, $Li_4$, Si, $Li_{4.4}Pb$, $Li_{4.4}Sn$ and/or $Li_{0.17}C(LiC_6)$, and the like. In one embodiment, the oxide ceramic compounds include, but are not limited to, SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, $TiO_2$ and/or FeO, and the like.

In one embodiment, the lithium compound is selected from lithium containing oxides (including lithium-transition metal complex oxides), including lithium-titanium complex oxide expressed as $Li_4Ti_5O_{12}$. In one embodiment, boron-doped carbon includes boron-doped graphite, and the like. In one embodiment, the lithium-metal compound is selected from $Li_3FeN_2$, $Li_{2.6}Co_{0.4}N$ and/or $Li_{2.6}Cu_{0.4}N$ In one embodiment, the cathode layer 306 is comprised of any suitable cathode material, including for example an insertion electrode such as $LiCoO_2$, $LiNi_{0.333}Mn_{0.33}Co_{0.33}O_2$, or $LiMn_2O_4$ and/or other higher voltage cathodes such as $LiCoPO_4$ or $LiMn_{1.5}Ni_{0.5}O_4$, although the embodiments are not so limited. In one embodiment, cathode materials can comprise, for example, manganese oxide ($MnO_2$), iron oxide, copper oxide, nickel oxide, lithium-manganese complex oxide (e.g., $Li_xMn_2O_4$ or $Li_xMnO_2$), lithium-nickel complex oxide (e.g., $Li_xNiO_2$), lithium-cobalt complex oxide (e.g. $Li_xCoO_2$), lithium cobalt nickel oxide ($LiNi_{1-y}Co_yO_2$), lithium-manganese-cobalt complex oxide (e.g., $LiMn_yCo_{1-y}O_2$), spinel-phase lithium-manganese-nickel complex oxide (e.g., $Li_xMn_{2-y}Ni_yO_4$), lithium phosphates (e.g., $Li_xFePO_4$, $Li_xFe_{1-y}Mn_yPO_4$ such as $Li_xFe_1PO_4$, $Li_xCoPO_4$, $LiNiPO_4$), lithium phosphate having a NASICON-type structure (e.g., $Li_xV_2(PO_4)_3$), iron (III) sulfate ($Fe_2(SO_4)_3$), and/or vanadium oxides (e.g., $V_2O_5$). In various embodiments, x and y in these chemical formulas can lie within the ranges of $1 \leq x \leq 5$, and $0 \leq y \leq 1$.

In one embodiment, the oxide ceramic electrolyte 304 in FIG. 3 is additionally or alternatively stable against sodium (Na). In one embodiment, sodium-based energy storage devices containing the oxide ceramic solids made according to the methods described herein are provided. In one embodiment, the sodium-based energy storage devices include, for example solid-state Na-ion batteries and primary Na-air and rechargeable Na-seawater semi-fuel cells. In one embodiment, the anode layer 302 of FIG. 3, can be or can include metallic Na and the cathode layer 306 can be an insertion electrode, including any suitable insertion or alloying electrode, for example $NaCoO_2$, giving an all solid-state Na battery.

Various embodiments can include an electrolyte interface that is patterned with highly ordered features to increase the three-dimensional electrode/electrolyte, electrode/air, or electrolyte/air interface area. The increase in surface area can reduce the magnitude of the area specific resistance.

In one embodiment, a semi-fuel cell is provided. A semi-fuel cell can include, for example, an electrochemical cell that converts chemical energy into electric energy, wherein at least one half-cell of the electrochemical cell uses a fuel wherein reactants flow into the cell and reaction products exit the cell or solid reaction products deposit on or in the electrode of the cell (e.g. thermodynamically essentially an open system), and wherein at least one half-cell of the electrochemical cell does not require a fuel (e.g. is self-contained like the electrochemical half-cells of a battery, thermodynamically essentially a closed system during discharge).

Figure 4A:
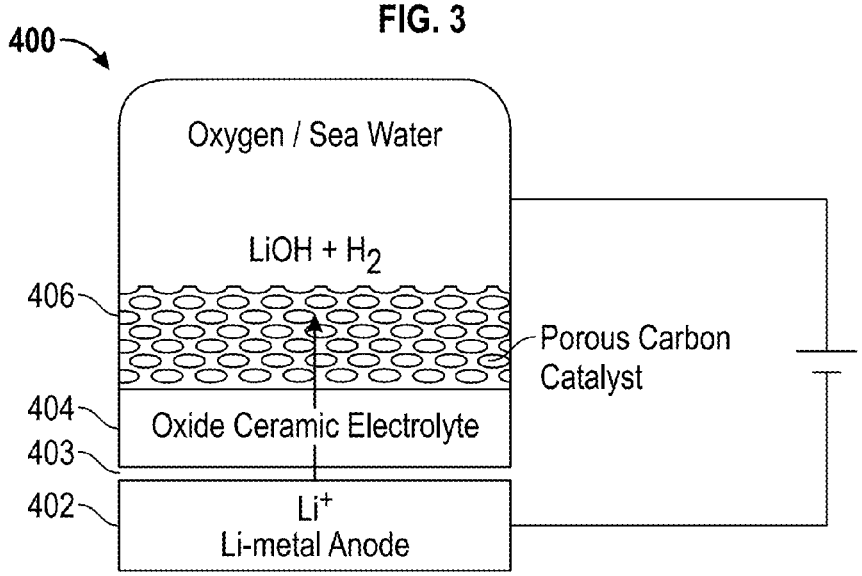
FIG. 4A illustrates a lithium (Li)/seawater semi-fuel cell containing a solid oxide ceramic electrolyte according to an embodiment.
Figure 4B:
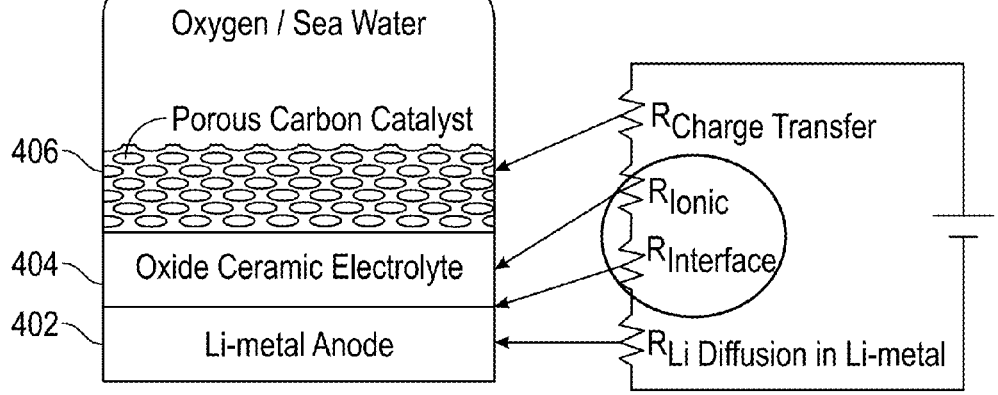
FIG. 4B illustrates the function of each layer of the Li/seawater semi-fuel cell in FIG. 4A containing a solid oxide ceramic electrolyte according to an embodiment.

A lithium/seawater semi-fuel cell (LSSFC) 400 is shown in FIG. 4A which comprises a Li-metal anode 402 stacked beneath an oxide ceramic electrolyte membrane (Oxide CEM) 404 and having an Oxide CEM/Li anode interface 403 there between, and a porous carbon catalyst 406 stacked on top. In the LSSFC 400, lithium ions are transported through the Oxide CEM 404 through the interface 403 which only allows Li ions to travel from the Li anode 402 to the seawater 410 where it forms LiOH, while simultaneously forming $H_2$ gas and sending electrons through an external circuit, as shown in FIG. 4B. Such energy densities are, in one embodiment, higher than in Li-ion energy storage devices.

Not intending to limit the embodiments to any particular theory of operation, there appear to be fewer phenomena that contribute to the cell impedance in LSSFCs 400 (FIGS. 4A and 4B) as compared to Li-ion batteries. For example, the rate of LiOH formation and diffusion out of the porous carbon catalyst 406 (referred to as "charge transfer") is significantly higher than the transport phenomenon that occurs in other types of semi-fuel cells. Additionally, the transport of Li ions through the Oxide CEM 404 is limited by the intrinsic ionic conductivity of the material used to make the Oxide CEM 404. Furthermore, transport through the Oxide CEM/Li anode interface 403 is affected by the stability, ionic conductivity and thickness of the solid electrolyte interfaces and interphases (SEI). Transport of Li atoms to the SEI is also known to be governed by the rate of self-diffusion of Li. Therefore, the thicker the Li metal anode 402, the longer it takes to be consumed for a given rate of cell discharge.

One method of estimating the effect of self-diffusivity of Li includes using a known value of self-diffusivity ($7 \times 10^{-11}$ $cm^2/s$ at room temperature). The Li anode thickness can be plotted against the time required to react all of the Li in the anode, shown by the data with Δ in FIG. 5A. Messer, R. and Noack, F. Appl. Phys. 6, 79-88 (1975). Such an analysis assumes that all other sources of resistance do not limit the discharge rate. For example, when the Li anode (e.g., 402) is about 500 microns thick or less, the total time to consume all of the Li is shown to be less than about 100 hours. Thus, if the application uses discharge rates lower than about C/100 (e.g. where C equals the inverse of time taken to fully charge or discharge, C/100 refers to a discharging of the cell in 100 hours), self-diffusivity does not limit the full utilization of Li. This analysis can be useful when estimating the useful energy density of LSSFCs.

Figure 5A:
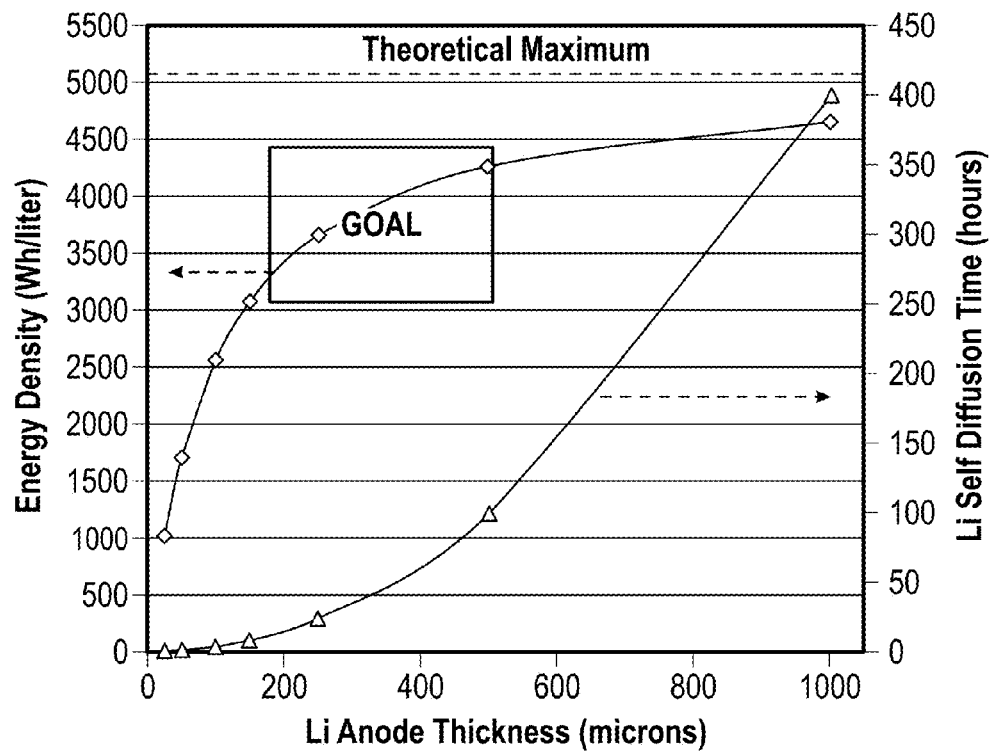
FIG. 5A is a graph showing energy density and Li self-diffusion time versus Li anode thickness for Li/seawater semi-fuel cells containing a solid oxide ceramic electrolyte and an anode of varying thickness according to various embodiments.
Figure 5B:
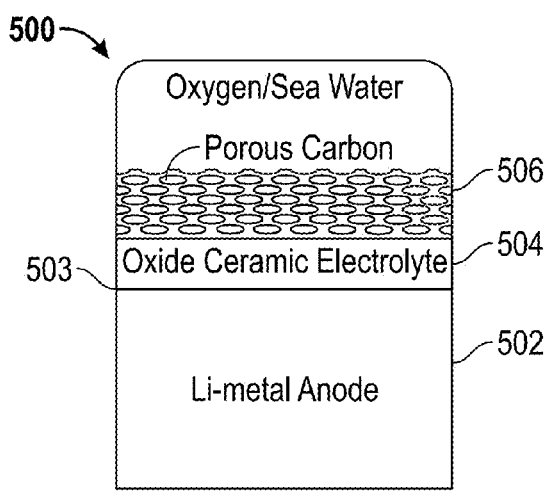
FIG. 5B illustrates a Li/seawater semi-fuel cell having a solid oxide ceramic electrolyte and a thicker volume of Li per unit volume of the entire semi-fuel cell stack as compared with the Li/seawater semi-fuel cell of FIG. 3.

One strategy for maximizing energy density in LSSFCs involves maximizing the volume contribution of Li per unit volume of the stack, shown by the data with ♦ in FIG. 5A and the semi-fuel cell 500 in FIG. 5B. The energy density projections in FIG. 5A assume that the thickness of the Oxide CEM 502 (FIG. 5B) and the porous carbon catalyst 506 (i.e., "current collector") are both fixed at 50 μm each. The electrochemical reaction is based on the formation of LiOH at 2.6 V. As the thickness of the Li anode 502 is increased from 25 to 500 μm, the energy density increases rapidly. After 500 μm, the rise in energy density subsides since the volume of the Oxide CEM 504 and porous carbon catalyst 506 becomes negligible compared to the volume of Li. The maximum theoretical energy density of pure Li is 5,100 Wh/L, assuming that no electrolyte or porous carbon catalyst is used.

In one embodiment, the Li anode thickness (e.g., 502) can be greater than 250 microns when the Oxide CEM (e.g., 504) and porous carbon catalyst (506) are fixed at a thickness of at least 1 μm and no more than 250 μm, such as approximately 50 μm In these embodiments, the semi-fuel cell 500 can achieve greater than two times, four times, six times, eight times, or even greater than ten times the energy density of Li ion batteries (assuming state-of-the-art is 300 Wh/L), including any range there between. The above estimation shows that LSSFCs can achieve high energy densities, assuming the resistance of the Oxide CEM 504 and Oxide CEM/Li anode interface 503 is negligible.

In one embodiment an Oxide CEM (e.g., 404, 504) is provided with an ionic conductivity in approximately the $1 \times 10^{-3}$ S/cm range or greater and/or are tough enough (i.e., resistant to breaking, cracking and/or peeling) to maintain integrity at approximately 50 μm thick, and/or are chemically stable in contact with Li (i.e., does not react with metallic lithium) and seawater.

The various oxide ceramic solids produced herein, such as LLZO, can possess high ionic conductivity and are stable in contact with metallic Li. When compared with other known electrolytes, the oxide ceramic solids described herein contain higher amounts of metal (e.g., Li) per unit cell, thus enhancing ionic conductivity. For example, the atomic ratio of Li to the other atoms in the unit cell in LLZO is 0.44, which is higher than 0.066 for LATP. Additionally, and not intending to limit various embodiments to any particular theory of operation, the stability of the Zr, La and supervalent cation dopant oxidation states are significantly higher than Ti-based ceramic electrolytes; thus, LLZO can be chemically stable against Li.

Various embodiments can have increased total interface surface area per unit of superficial area via the introduction of highly ordered arrays of three-dimensional (3D) features. Some embodiments encompass substantially any 3D feature in an oxide ceramic solid that increases the surface area compared to a surface that does not possess the 3D feature. For example, the 3D features can include posts or wells of any suitable shape or depth. In one example, the 3D features can include cylinders projecting from the surface. In another example, the 3D features can include cylindrical recesses in the surface. Examples of suitable 3D shapes include squares, rectangles, any conical sections, or combinations thereof. The 3D shapes can project from the surface, be recessed in the surface, or a combination thereof. Suitable depths, heights, or average thicknesses of shapes can include, for example, up to about 1 micron, 2 microns, 5 microns, 10 microns, 20 microns, 40 microns, 60 microns, 80 microns, 100 microns, 120 microns, 140 microns, 160 microns, 180 microns, 200 microns, 500 microns, or about 1000 microns, including any range there between.

The various embodiments described herein encompass the use of the method and 3D features formed using any suitable material. In one embodiment, the method of forming 3D features, and the 3D features, can be formed from LLTO (perovskite) and LATP (NASICON).

Figure 6D:
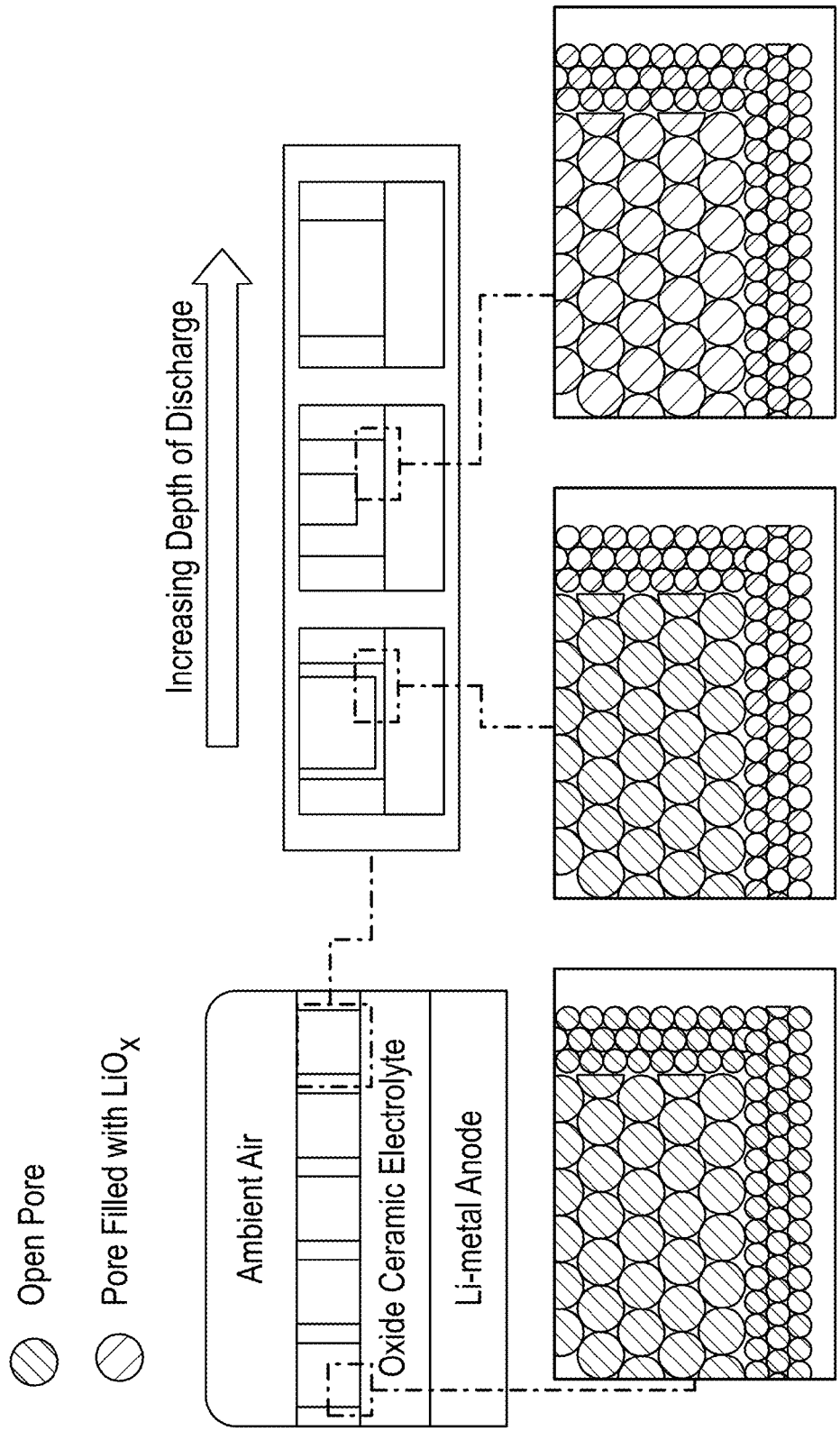
FIG. 6D illustrates 3D post designs for a semi-fuel cell containing a solid oxide ceramic electrolyte according to various embodiments.

In one embodiment, methods of generating 3D features can be achieved using the processes illustrated in the embodiments shown in FIGS. 6A-6D. One method of forming the 3D features includes deposition of oxide ceramic solid slurries in an array of highly ordered structures (FIG. 6A). The method of deposition of the slurries can be, for example, ink jet printing. The slurries can be deposited on an Oxide CEM. For example, the Oxide CEM can be a dense, pre-sintered Oxide CEM. After deposition, the deposited structures can be calcined, to cause drying of the slurries and sintering, giving an array of highly ordered structures.

The oxide ceramic solid slurry can be, for example, any mixture that includes oxide ceramic solid powder and a liquid selected from, but not limited to, water, any protic, aprotic, or dipolar aprotic non-aqueous organic solvent, an aromatic hydrocarbon, aliphatic hydrocarbon, alcohol, aldehyde, ketone, amine, amide, ester, ether, glycol, glycol ether, alkyl halide, or an aromatic halide and combinations thereof. As the slurry dries, the shape of the slurry can change slightly, due to the evaporation of liquid from the slurry. In some embodiments, the oxide ceramic solid is printed on the Oxide CEM. The printing can be any suitable printing method that allows deposition of the oxide ceramic solid slurry on the Oxide CEM, such as ink-jet printing.

Another method of formation of the 3D features includes fabrication of the features by adding slurries of oxide ceramic solid powder to an Oxide CEM around a mold, FIG. 6B. The Oxide CEM can be a dense, pre-sintered Oxide CEM. The slurry can be dried, and is the mold can be removed by any suitable method. In one example, the mold is a patterned sheet, and is selectively removed from the Oxide CEM during a sintering step, leaving behind oxide ceramic solid with the 3D features. In one embodiment, the mold is a patterned sheet (e.g., porous graphite foil), and is selectively oxidized or vaporized away to expose the 3D features. In one embodiment, the mold comprises fibers bonded to the Oxide CEM, and is removed by burning during a heating step and/or by being selectively dissolved. See, for example, U.S. Pat. No. 7,837,913 which is hereby incorporated herein by reference in its entirety. The fibers can include, for example, a polymer, and can be self-assembled. The polymer can be, for example, any suitable polymer known by one of skill in the art, including natural or synthetic polymers. For example, polymethylmethacrylate, polystyrene, or polyvinylalcohol can be suitable polymers. For example, polymers disclosed in U.S. Pat. No. 7,837,913 which is hereby incorporated by reference herein in its entirety, can be used. A separate heating step can occur to cause sintering, or a heating step that removes or shrinks the mold can also cause sintering.

In one embodiment, 3D features are formed using a stamp (FIG. 6C). A slurry of oxide ceramic solid powder can be applied on to an Oxide CEM, dried, and patterned with a stamp, such as a high precision metal stamp. The application method of the oxide ceramic solid slurry can be, for example, tape casting or blade casting. In other embodiments, the application method can be spin coating. The stamp can be made using, for example, electro discharge machining. After stamping, a heating step can cause sintering.

In various embodiments, a process is provided for fabricating hierarchical and highly ordered porosity-in-air cathodes to prevent pore occlusion, thus facilitating discharge kinetics and reversibility. Facilitating improved lithium-air cathode kinetics and reversibility can benefit from precise control of porosity. The porosity can be engineered to prevent pore occlusion and to facilitate the distribution of lithium ions throughout the 3D features. In some embodiments, the 3D feature design involves smaller ordered, spherical pores lining the surface of the electrolyte membrane as well as the ordered post structures (FIG. 6D). During discharge, the smaller pores can be filled first, but in doing so do not occlude porosity or isolate porosity. The electrolyte forms a percolative or continuous structure, thus lithium ions can be continuously delivered beyond the filled smaller pores to enable further discharge. As the depth of discharge increases, the pore diameters increase as the distance from the electrolyte membrane and the posts increases.

In the embodiment shown in FIG. 6D, only two different pore diameters are shown, but various embodiments include a wide range of pore diameters tailored to the application of interest. The 3D feature design can prevent pore occlusion by the deposition of solid byproducts as well as provides a continuous network of electrolyte to deliver ions throughout the volume occupied between posts. Such embodiments can be formed using self-assembled patterning similar to the process that is used to fabricate inverse opal structures.

Figure 7:
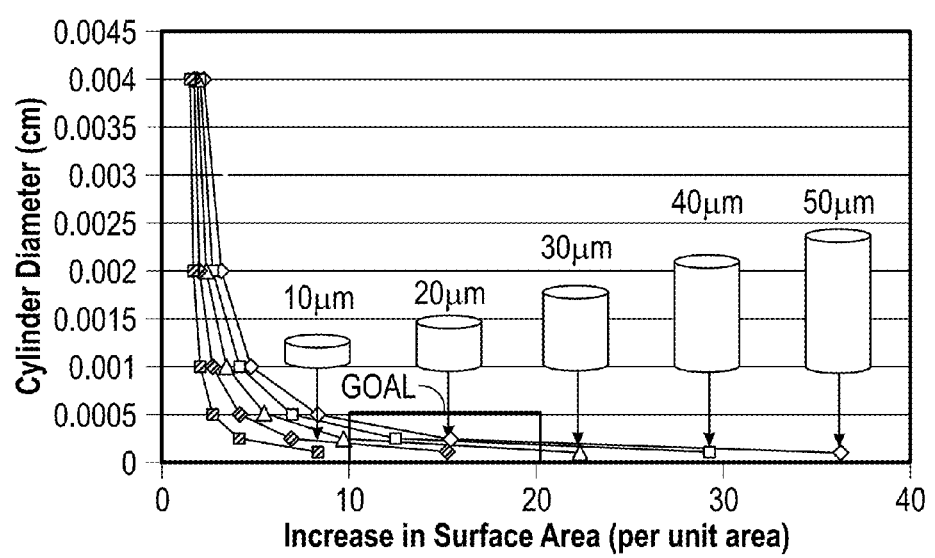
FIG. 7 is a graph showing cylinder diameter versus increase in surface area using an array of highly ordered posts in a solid oxide ceramic electrolyte according to various embodiments.

An estimation of the increase in surface area as a function of the patterned feature diameter and height (assuming a cylindrical geometry) is shown in FIG. 7. Assuming hexagonal packing and the separation between features are substantially the same as their diameter, the number of posts per unit of superficial area increases as the diameter decreases. Likewise, the surface area per unit of superficial surface area increases as the diameter decreases. Similarly, as the height of the features increase, the surface area increases per unit of superficial surface area. Various embodiments have an increase in the surface area by any suitable factor, for example a factor of ten, which can be accomplished with features that are, for example, a maximum of five microns in diameter and a minimum of 50 microns tall.

Various embodiments provide the deposition of thin films of an oxide ceramic solid, such as LLZO. Such embodiments allow the formation of oxide ceramic solid films with thickness of about 1 nm to about 1000 nm, or about 50 nm to about 750 nm, or about 100 nm to about 500 nm, including any range there between. Methods for forming such firms can include coating using an oxide ceramic solid slurry. In some embodiments, the method can include coating using sol-gel coating techniques known in the art such as spin or dip coating.

Sol-gel coating technology can be used to coat thin films of ceramic oxides onto substrates for a variety of applications. The process can include dipping the substrate of interest into a sol or slurry and extracting the substrate at a specific rate to cause uniform condensation or adherence of the sol onto the substrate. Sol-gel coatings can be in the nm to hundreds of nanometer range, for example. Sols can be applied to a substrate and spun-on using spin coating technology. The sol-gel process can be advantageous since it can be less expensive and faster than other thin film deposition techniques including, for example, sputtering or molecular beam epitaxy, although such processes remain viable options. Additionally, by generating a thin electrolyte layer, the sol-gel coating process can minimize the resistance of the electrolyte, which in turn can lower the respective cell resistance. Various embodiments provide dip or spin coating of oxide ceramic solids produced according to the methods described herein, and can produce thin oxide ceramic solid films cheaply and quickly.

The 3D features and associated formation techniques described herein can be integrated into and used with solid state Li/Na batteries to facilitate ionic transport and reduce area specific resistance. The anode and cathode include, for example, electrochemically active powders, and a conductive additive such as carbon. The blends can then be sintered to form dense electrodes separated by a dense layer of oxide ceramic solid. For example the cathode layer in the embodiment shown in the battery shown in FIG. 8A can be a blend of several materials, including a cathode material, such as those listed herein. In one embodiment, the anode comprises a similar blend. In one embodiment, $Li_4Ti_5O_{12}$, Sn and/or Si based alloys can be used for the anode. The oxide ceramic solid as the electrolyte can provide a continuous ionic pathway between the cathode and anode. The oxide ceramic solid has 3D features, such as described in the above section on interfacial impedance. In this configuration, the high aspect ratio oxide ceramic solid feature facilitates the transport of ions through the thickness of the stack and increases the surface area to lower the area specific resistance. FIG. 8B provides a perspective view of the battery of FIG. 8A and FIG. 8C is a top view.

Figure 9A:
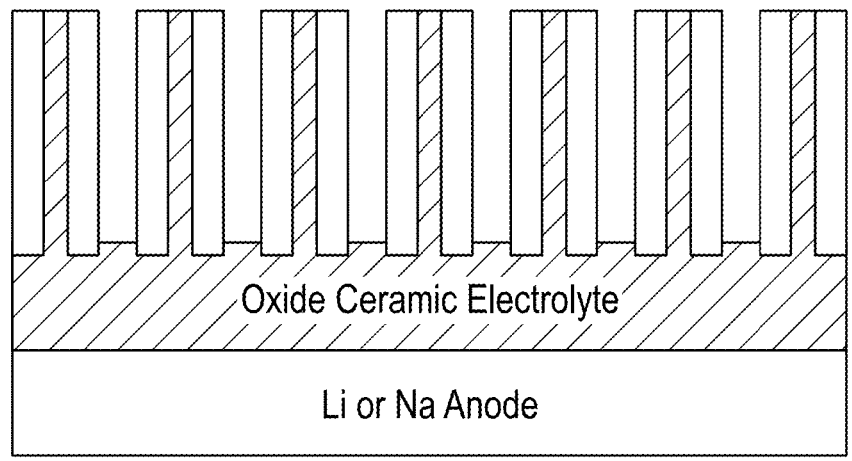
FIG. 9A illustrates a Li or sodium (Na)-air battery employing a solid oxide ceramic electrolyte and a porous current collector according to an embodiment.
Figure 9B:
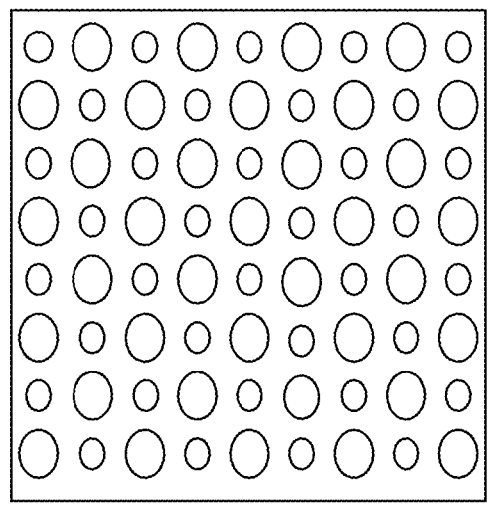
FIG. 9B is a top view of the battery of FIG. 9A according to an embodiment.

In lithium air semi-fuel cells, as the semi-fuel cell is discharged, lithium ions diffuse from the anode to the open air to eventually react with oxygen to form lithium in the form of, for example, $Li_2O_2$ and $Li_2O$. Use of the 3D features described in the above section can enable the growth of $Li_2O_2$ and $Li_2O$ on an increased surface area during operation of the cell, allowing a decreased solid-state diffusion distance of lithium ions, as compared to a typical flat or planar electrolyte interface. The semi fuel-cell shown in FIGS. 9A (side view) and 9B (top view) has vertical ordered channels to re-orient $Li_2O_2$ growth in the plane of the stack, thus improving performance.

Figure 10:
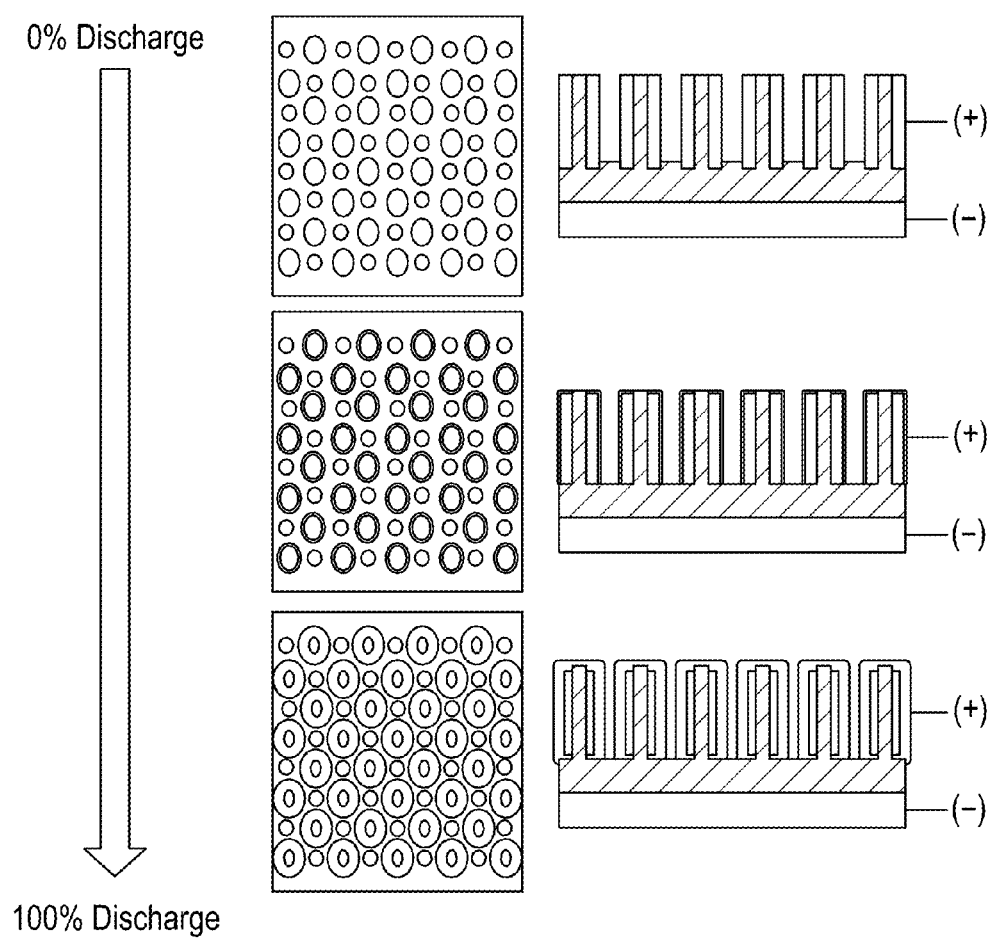
FIG. 10 illustrates the growth of $Li_2O_2$ as a function of the depth of discharge according to an embodiment.

FIG. 10 depicts the growth of $Li_2O_2$ as a function of depth of discharge. By increasing the surface area, the depth of the $Li_2O_2$ layer in any given location is less as compared to the $Li_2O_2$ that grows on a flat or planar electrolyte interface; consequently, the lithium ions have a shorter distance to diffuse before they reach oxygen. The shorter diffusion distances enabled by various embodiments can result in faster kinetics (e.g. higher power) and better utilization of the anode.

As described above, one embodiment provides a method of making an electrolyte interface. The method includes providing a slurry or a ceramic electrolyte, which, in one embodiment, can include $Li_7La_3Zr_2O_{12}$. The method includes forming at least one 3D feature on the ceramic electrolyte. Forming the at least one 3D feature on the ceramic electrolyte provides an un-sintered electrolyte interface which can include the slurry. The method can further include sintering the un-sintered electrolyte interface which provides an electrolyte interface.

In various embodiments, batteries, fuel cells, and semi-fuel cells are provided which include the electrolyte interfaces described herein. Methods of making batteries, fuel cells, and semi-fuel cells that include the method of making electrolyte interfaces are also provided. The various oxide ceramic solids, (e.g., cubic phase $Li_7La_3Zr_2O_{12}$) described herein can be included in the electrolyte of the battery, fuel cell, or semi-fuel cell. In one embodiment, the battery, fuel cell and/or semi-fuel cell are solid-state devices. The battery and/or semi-fuel cell can be a primary or secondary battery or semi-fuel cell, respectively.

The various embodiments will be further described by reference to the following examples, which are offered to further illustrate various embodiments of the present invention. It should be understood, however, that many variations and modifications may be made while remaining within the scope of the various embodiments.

Examples 1-9

General Conditions

Starting Materials.

Lithium nitrate hydrate (99.999% from Alfa Aesar), lithium acetate dehydrate (Reagent grade from Sigma Aldrich), lanthanum nitrate hexahydrate (99.9% from Alfa Aesar), zirconium n-propoxide (70% w/w solution in n-propanol from Alfa Aesar), glacial acetic acid (analytical reagent grade from J. T. Baker), N,N-dimethylformamide (anhydrous 99.8% from Sigma Aldrich), methanol (99.99% from Sigma Aldrich), chloroform (analytical reagent grade from J. T. Baker), n-Propanol (analytical reagent grade from J. T. Baker), ammonium hydroxide (analytical reagent grade from J. T. Baker) and aluminum oxide (50 nm Gamma "B" from Mager Scientific Inc) were used as starting materials for the sol/condensation process.

Conditions.

All syntheses were performed at room temperature and ambient humidity.

Planetary Milling.

Lithium Carbonate (Puratronic 99.998% from Alfa Aesar), Lanthanum (III) Hydroxide (99.95% from Alfa Aesar) and Zirconium Oxide (99.9% pure and APPS 30-60 nm from Inframat Advanced Materials LLC) were added into a planetary mill with the requisite ratio for obtaining a $Li_7La_3Zr_2O_{12}$ with a 0.7 weight percentage of Aluminum added from Alumina (50 nm Gamma "B" from Mager Scientific Inc). An agate vial was used to prevent contamination from milling media. The powders were loaded into a 125 mL agate vial with 9 agate balls (10 mm diameter) and ground at 300 rpm for 4 hours. After milling, the powders were collected and cold pressed into pellets (10 MPa) to achieve intimate particle-particle contact.

Calcination.

The pellets were placed in an alumina combustion boat (Coors Combustion boat from Sigma Aldrich) and fired in air in a Lindberg Blue M Tube Furnace (from Thermo Scientific) at 1000° C. for 4 hours using a heating rate of 100° C./hr. The pellets were also fired in a similar gas handling tube furnace under a flowing argon (99% pure) atmosphere using a gas flow rate of 0.5 scfm. Also the gas handling unit was flushed with argon for 30 minutes before starting the calcination process in order to remove oxygen. The fired pellets were let to cool down by turning off the furnace at the end of 4 hour dwell time and crushed to perform powder XRD analysis (Bruker AXS D8 Advance with Da Vinci).

Post Calcination Processing.

The calcined pellets were ground into powders on a mortar and pestle. The ground powders were milled in the planetary mill under similar conditions as the precursor powders for 1 hour. The resulting powders were collected and hot pressed at 1000° C. and 40 MPa for 1 hour.

Electrochemical Impedance Spectroscopy and SEM.

The resulting high density pellets were mounted on a crystalbond wax (SPI) and polished. The polished pellets were sputter coated with a gold layer of thickness 105 nm (approximate). Gold coated samples were mounted on a pressure calibration unit and electrochemical impedance spectroscopy was carried out (Princeton Applied Research VersaSTAT) from 100 kHz to 1 Hz. Thermal etching was carried out on polished samples at 1000° C. for 4 hrs using a heating rate of 100° C./hr.

Examples 1-6

Example 1

Synthesis of an n-propanol lithium-lanthanum-zirconate Gel

Acetic acid (0.172 mL) was added to n-propanol (5.258 mL). The solution was stirred for 5 min. Zirconium n-propoxide (0.896 mL) was added to the solution and stirred for 20 min to produce a zirconium solution.

Lanthanum nitrate hexahydrate (1.299 g) was added to n-propanol (5.26 mL) and stirred for 10 min. Lithium nitrate hydrate (0.487 g) was added to the solution and stirred for 30 minutes to produce a lithium-lanthanum solution. The lithium-lanthanum solution was added dropwise to the zirconium solution, to produce a n-propanol lithium-lanthanum-zirconate gel.

Example 2

Synthesis of a methanol/chloroform lithium-lanthanum-zirconate Gel

Acetic acid (0.127 mL) was added to chloroform (8.13 ml) and stirred for 5 min. Zirconium n-propoxide (0.896 mL) was added to the solution and stirred for 20 min to produce a zirconium solution.

Lanthanum nitrate hexahydrate (1.299 g) was added to methanol (4.054 mL) and stirred for 10 min. Lithium nitrate hydrate (0.487 g) was added to the solution and stirred for 30 min to produce a lithium-lanthanum solution.

The lithium-lanthanum solution was added dropwise to the zirconium solution to produce a chloroform/methanol lithium-lanthanum-zirconate gel.

Example 3

Synthesis of an n-propanol/N,N-dimethylformamide lithium-lanthanum-zirconate Gel Acetic acid (0.143 mL) was added to n-propanol (5.258 mL) and stirred for 5 min. Zirconium n-propoxide (0.896 mL) was added to the solution and stirred for 20 min to produce a zirconium solution.

Lanthanum nitrate hexahydrate (1.299 g) was dissolved in N,N-dimethylformamide (5.402 mL) and stirred for 10 min. Lithium nitrate hydrate (0.487 g) was added to the solution and stirred for 30 min to produce a lithium-lanthanum solution.

The lithium-lanthanum solution was added dropwise to the zirconium solution to produce a n-propanol/N,N-dimethylformamide lithium-lanthanum-zirconate gel.

Example 4

Synthesis of an n-propanol/N,N-dimethylformamide/ammonium hydroxide lithium-lanthanum-zirconate Gel Acetic acid (0.143 mL) was added to n-propanol (5.258 mL) and stirred for 5 min. Zirconium nitrate hexahydrate (0.896 mL) was added to the solution and stirred for 20 min to produce a zirconium solution.

Lanthanum nitrate hexahydrate (1.299 g) was added to N,N-dimethylformamide (5.402 mL) and stirred for 10 min. Lithium acetate (0.721 g) dihydrate was added to the solution and stirred for 30 min to produce a lithium-lanthanum solution.

The lithium-lanthanum solution was added dropwise to the zirconium solution to produce a lithium-lanthanum-zirconate solution. Thereafter, ammonium hydroxide (3.907 mL) was added dropwise to the lithium-lanthanum-zirconate solution to produce a n-propanol/N,N-dimethylformamide/ammonium hydroxide lithium-lanthanum-zirconate gel.

Example 5

Synthesis of lithium-lanthanum-zirconate gel in n-propanol with alumina oxide Powder Acetic acid (0.172 mL) was added to n-propanol (5.258 mL) and stirred for 5 min. Zirconium n-propoxide (0.896 mL)

was added to the solution and stirred for 20 min. Aluminum oxide powder (1.36 mg) was added to the solution and stirred for 10 min to produce a zirconium/aluminum oxide solution.

Lanthanum nitrate hexahydrate (1.299 g) was added to n-propanol (5.258 mL) and stirred for 10 min. Lithium nitrate hydrate (0.487 g) was added to the solution and stirred for 30 min to produce a lithium-lanthanum solution.

The lithium-lanthanum solution was added dropwise to the zirconium solution to produce a n-propanol lithium-lanthanum-zirconate gel.

Example 6

Synthesis of lithium-lanthanum-zirconate gel in n-propanol with alumina oxide Powder Acetic acid (0.172 mL) was added to n-propanol (7.511 mL) and stirred for 5 min. Zirconium n-propoxide (0.896 mL) was added to the solution and stirred for 20 min. Aluminum oxide powder (13.76 mg) was added to the solution and stirred for 10 min to produce a zirconium/aluminum oxide solution.

Lanthanum nitrate hexahydrate (1.299 g) was dissolved in n-propanol (7.511 mL) and stirred for 10 min. Lithium nitrate hydrate (0.487 g) was dissolved in the solution and stirred for 30 min to produce a lithium-lanthanum solution.

The lithium-lanthanum solution was added dropwise to the zirconium solution, giving an n-propanol lithium-lanthanum-zirconate gel.

Table 1 shows the conditions and remarks for Examples 1-6.

TABLE 1

Conditions and Remarks for Examples 1-6

| Example | Solvent | Moles Zr: total moles solvent (molar) | Additive | Drop rate (drop/sec) | Gelation time (min) | Remarks |
|---|---|---|---|---|---|---|
| 1 | PrOH | 1:70 | none | 1 | 30 | Opaque-White |
| 2 | MeOH/CHCl$_3$ | 1:100 | none | 1 | 50 | Opaque-White |
| 3 | PrOH/DMF | 1:70 | none | 1 | 60 | Opaque-White |
| 4 | PrOH/DMF/NH$_4$OH | 1:109 | none | 1 | 10 | Transparent |
| 5 | PrOH | 1:60 | Al$_2$O$_3$ | ~1 | 30 | Opaque-White |
| 6 | PrOH | 1:100 | Al$_2$O$_3$ | ~1 | 30 | Opaque-White |

Although the LLZO gel in Example 1 was synthesized within 30 min of gelation time, removal of solvent by evaporation at room temperature took a relatively long time, e.g. several days. In Example 2, using the mixture of MeOH/CHCl$_3$, gelation time was slightly increased compared to Example 1 but the gel dried quickly at room temperature. In Example 4, using ammonium hydroxide as a co-solvent, transparent Li—La—Zr gel was synthesized at room temperature.

The highly dispersed Al$_2$O$_3$—Li—La—Zr gel was easily synthesized at room temperature in Examples 5 and 6. FIG. 11 shows a transparent Li—La—Zr gel as synthesized in Example 5 and dried at room temperature to evaporate the solvent. As can be seen, the novel methods described herein can produce a substantially light or white colored product containing metal-oxide bonds, as compared to the chelation only or solvated ions held in suspension within a polymerized network

Examples 7-9

Example 7

Heat Treatment of Lithium-Lanthanum-Zirconate Gel—Cold Pressed Heat Treatment

Figure 12:
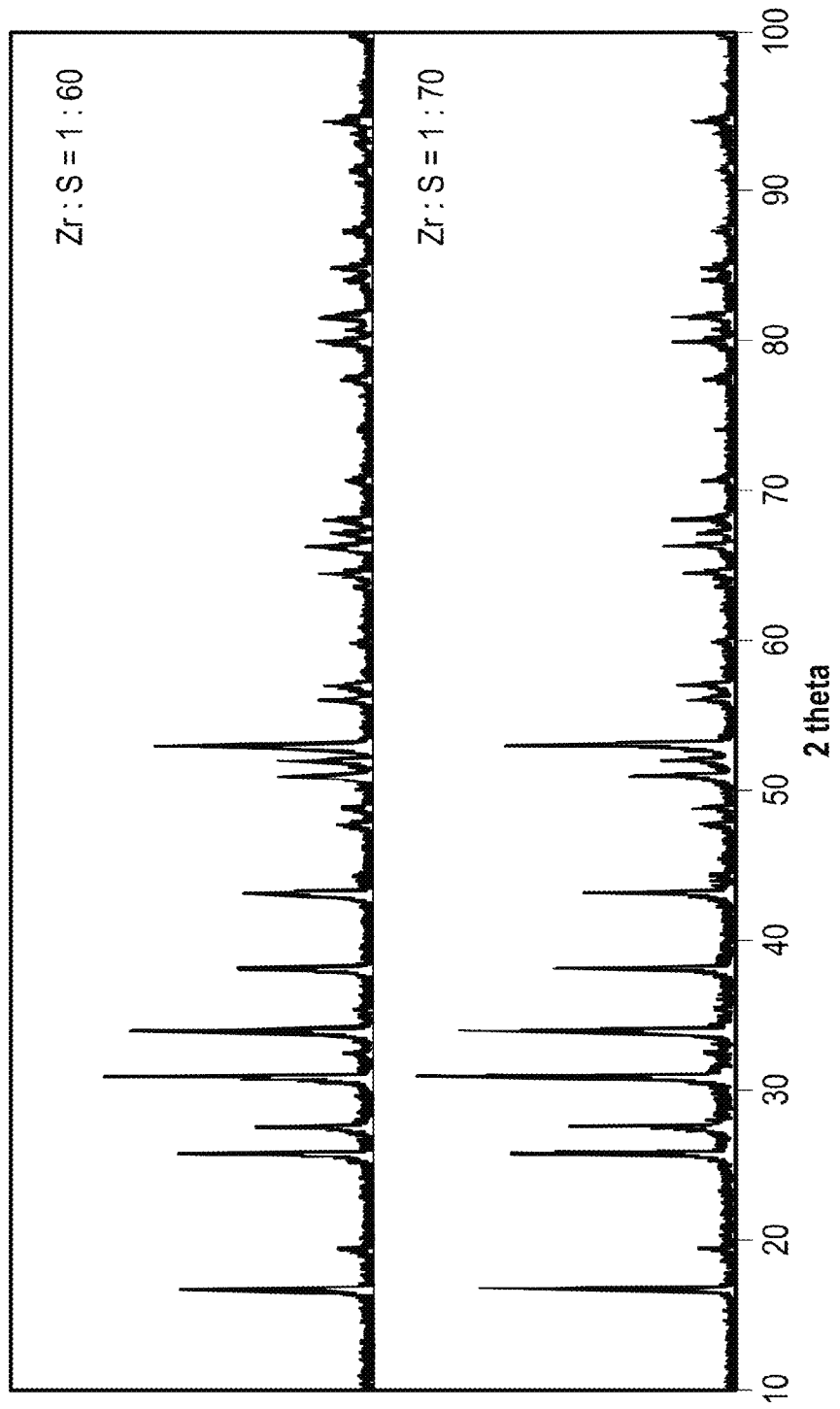
FIG. 12 illustrates XRD patterns of LLZO prepared according to a non-aqueous solution based reaction (hereinafter "sol/condensation process") according to an embodiment.

The dried gels generated in Examples 5 & 6 were thereafter pre-heat treated at a temperature of approximately 600° C. to produce a white Al$_2$O$_3$—Li—La—Zr powder, which was ball-milled about 2 minutes then pressed into a pellet. The pellet was then calcined at 1000° C. in air for approximately 4 hrs to produce calcined cubic LLZO which was then sintered at 1000° C. for approximately 1 hour at 40 MPa pressure in argon. The cubic LLZO was then subjected to x-ray crystallography using a Bruker AXS D8 Advance with Da Vinci X-Ray Diffactometer, producing an XRD pattern shown in FIG. 12. In FIG. 12, the top XRD pattern corresponds to Example 5, and the bottom XRD pattern corresponds to Example 6. These results verify that the product produced was cubic phase LLZO.

Example 8

Heat Treatment of Lithium-Lanthanum-Zirconate Gel—Hot Pressed Heat Treatment

The same process as Example 7 was followed, except that the powder was pressed into a pellet with a heat treatment of 1000° C. in argon. The ionic conductivity was measured with a VersaSTAT Potentiostat using Electrochemical Impedance Spectroscopy at $4.75 \times 10^{-4}$ S/cm. The density was measured using geometric and gravimetric measurements at 96% as compared to a theoretical (calculated) density of cubic LLZO of 5.19 g/cm$^3$.

Example 9

Solid State Reaction Synthesis of Cubic LLZO

LLZO powder was prepared by planetary ball milling as described by Weppner in U.S. Patent Pub. 2010/203383, which is incorporated herein by reference in its entirety. The powder was then hot pressed at 50 MPa pressure at 1000° C. in argon for 1 hour, as described in Example 8. A 22 mm diameter, 3 mm thick puck of cubic phase garnet LLZO was generated. The density was measured using geometric and gravimetric measurements to be 4.978 g/cm$^3$, or 97.6% dense as compared to a theoretical (calculated) density of cubic LLZO of 5.19 g/cm$^3$. Parallelepipeds were diced from the puck using a digital low speed diamond saw, and sputter coated with gold using a gold sputter coated. The ionic conductivity of $3.9\times10^{-4}$ S/cm was measured using Electrochemical Impedance Spectroscopy (EIS)

Example 10

Figure 13:
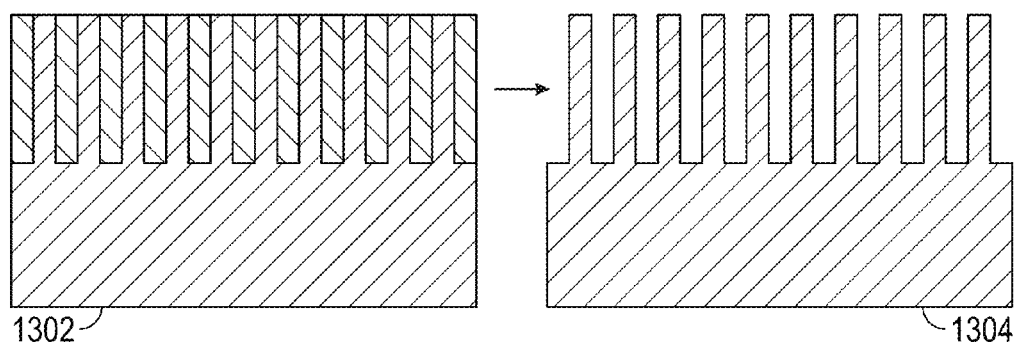
FIG. 13 illustrates a method of patterning ceramic interfaces using porous sacrificial graphite foil according to an embodiment.
Figure 14A:
FIGS. 14A and 14B are SEM images of a patterned LLZO ceramic membrane at a magnification of 30× (FIG. 14A) and 200× (FIG. 14B) made according to the method described in Example 10 according to an embodiment.
Figure 14B:

LLZO powder was pressed into porous graphite foil (100 microns thick with 75 micron diameter cylindrical holes) 1302 as shown schematically in FIG. 13. The pressing was conducted at 650 C, 40 MPa pressure and in an argon atmosphere. Upon cooling, the assembly was removed and placed in a furnace and reheated in air to selectively burn off the graphite foil leaving posts 1304 on the surface of LLZO as shown in FIG. 13. FIG. 14 shows SEM images of the patterned LLZO posts.

The various embodiments described herein comprise a method comprising combining a chelating agent, one or more non-aqueous organic solvents and one or more metallic compounds to produce an oxide ceramic solid in a non-aqueous solution-based reaction (i.e., sol/condensation process), wherein the oxide ceramic solid contains metal-oxygen-metal bonds. The sol/condensation process can include a gelation portion and a condensation portion. In one embodiment, the method further comprises adding a supervalent cation during the gelation portion of the non-aqueous solution-based reaction.

In one embodiment, the oxide ceramic solid is a cubic garnet having an atomic formula comprising: $A_xR_yC_zS_aO_{12}$, wherein A is a first cationic species selected from H, Li, Na, Mg, Al, Sc and/or Ga and residing in an 8a, 16f, 32g, 24d, 48g or 96h site; R is a second cationic species selected from La, Ba and/or Ce and residing in a 24c site; and C is a third cationic species selected from Zr, Ta, Nb, Y or Hf and residing in the 16a site, e.g., a cubic garnet having a nominal formula of $Li_7La_3Zr_2O_{12}$.

In one embodiment, the chelating agent, a first non-aqueous organic solvent and a first metallic compound are combined to form a first metal cation solution, the second and third metallic compounds and a second non-aqueous organic solvent are combined to form a second metal cation solution, and the first and second metal cation solutions are combined to produce the oxide ceramic solid.

In one embodiment, the method further comprises combining an aluminum compound and/or an aqueous solution with the first, second and/or third metal cation solutions and/or the oxide ceramic gel.

In various embodiments, the method can further comprise optionally drying the oxide ceramic solid to produce a dried oxide ceramic solid; heating the dried oxide ceramic solid to produce a crystalline or partially crystalline oxide ceramic powder; optionally milling the crystalline or partially crystalline oxide ceramic powder to produce reduced-size crystalline or partially crystalline oxide ceramic powder; and densifying the reduced-size crystalline or partially crystalline oxide ceramic powder to produce a densified oxide ceramic solid, wherein the densifying can comprise heating, pressing or a combination thereof. The densified oxide ceramic solid can be, in one embodiment, a pressed oxide ceramic pellet. In one embodiment, the milled oxide ceramic powder and/or the pressed oxide ceramic pellet can be heat treated.

Various energy storage devices can also be provided as described herein, including, for example an oxide ceramic pellet. In one embodiment, the energy storage device comprises at least one electrode which includes hydrogen, lithium, sodium, magnesium, aluminum or gallium.

A method of making an electrolyte interface is also provided. In one embodiment, the method comprises providing a slurry that includes an oxide ceramic compound having an atomic formula comprising: $A_xR_yC_zS_aO_{12}$, wherein A is a first cationic species selected from H, Li, Na, Mg, Al and/or Ga and residing in an 8a, 16f, 32g, 24d, 48g or 96h site; R is a second cationic species selected from La, Ba and/or Ce and residing in a 24c site; and C is a third cationic species selected from Zr, Ta, Nb, Y or Hf and residing in the 16a site; and providing an oxide ceramic electrolyte that includes a compound selected from $A_xR_yC_zS_aO_{12}$; forming at least one 3D feature on the oxide ceramic electrolyte, to provide an un-sintered electrolyte interface, wherein the 3D feature includes the slurry; and sintering the un-sintered electrolyte interface, to provide the electrolyte interface.

The forming step can comprise, for example, ink-jet printing the slurry on the oxide ceramic electrolyte, self-assembled patterning, using a mold, stamping the 3D feature into the slurry or using a mold. The mold can comprise, for example, fibers bonded to the oxide ceramic electrolyte or a patterned sheet.

In one embodiment, the at least one 3D features on the oxide ceramic electrolyte are arranged in a pattern to form an electrolyte interface with hierarchical and highly ordered porosity.

The use of a chelating agent not only coordinates with a metal to form a chelate, but also controls the pH and regulates the rate of hydrolysis and condensation. Such control results in finer particle sizes after sintering of the oxide ceramic solids. The chelating agent, in combination with one or more non-aqueous organic solvents and one or more metallic compounds combine, under the appropriate conditions, to produce a crystalline or partially crystalline oxide ceramic solid having metal-oxygen-metal bonds.

The resulting materials possess very low electrical conductivity (less than $10^{-8}$ S/m at room temperature). In one embodiment, electrodes having non-random porosity are provided. Such electrodes are highly-ordered or hierarchical electrodes are advantageously provided to significantly improve ionic transport and accelerate the formation of reacted byproducts in semi-fuel cells. Some embodiments can facilitate the transport of Li ions from one insertion electrode to another in a Li-ion cell, or facilitate the deposition of lithium in the form of, for example, $Li_2O_2$ and $Li_2O$, on the air cathode of a Li-air semi-fuel cell.

In some embodiments, area-specific interfacial impedance is reduced as compared to conventional electrolytes as a result of an increased interface surface area.

The various embodiments enable a new class of safe, durable, and low cost energy storage technology. For example, in some embodiments, a battery, fuel cell, or semi-fuel cell that includes the oxide ceramic solid can be relatively air or water stable, allowing easier construction (e.g. avoiding the need for a dry room) and reducing packaging requirements.

Although specific embodiments have been illustrated and described herein, it will be appreciated by those of ordinary skill in the art that any procedure that is calculated to achieve the same purpose may be substituted for the specific embodiments shown. For example, although the process has been discussed primarily using LLZO, other types of oxide ceramic solids can also be made and used. This application is intended to cover any adaptations or variations of the present subject matter. Therefore, it is manifestly intended that embodiments of this invention be limited only by the claims and the equivalents thereof.

What is claimed is:

1. A method of making an electrolyte interface comprising:
   providing a slurry formed using a chelating agent in a non-aqueous solution-based reaction performed at a temperature ranging from about −15 to about 50° C. and including an oxide ceramic compound having an atomic formula comprising: $A_xR_yC_zS_aO_{12}$,
wherein A is a first cationic species selected from H, Li, Na, Mg, Al and/or Ga and residing in an 8a, 16f, 32g, 24d, 48g or 96h site;
R is a second cationic species selected from La, Ba and/or Ce and residing in a 24c site; and
C is a third cationic species selected from Zr, Ta, Nb, Y or Hf and residing in the 16a site;
providing an oxide ceramic electrolyte that includes a compound selected from $A_xR_yC_zS_aO_{12}$;
forming at least one 3D feature on the oxide ceramic electrolyte to provide an un-sintered electrolyte interface, wherein the 3D feature includes the slurry; and
sintering the un-sintered electrolyte interface to provide the electrolyte interface.

2. The method of claim 1, wherein the forming step comprises ink-jet printing the slurry on the oxide ceramic electrolyte, self-assembled patterning, stamping the 3D feature into the slurry or using a mold.

3. The method of claim 2, wherein the mold comprises fibers bonded to the oxide ceramic electrolyte or a patterned sheet.

4. The method of claim 1, wherein the at least one of the 3D features on the oxide ceramic electrolyte is arranged in a pattern to form an electrolyte interface with hierarchical and highly ordered porosity.

5. An energy storage device comprising an electrolyte that includes an electrolyte interface made by the method of claim 1.

6. The energy storage device of claim 5 comprising a battery, fuel cell or semi-fuel cell.

7. The energy storage device of claim 6 comprising at least one electrode that includes lithium or sodium.

* * * * *

UNITED STATES PATENT AND TRADEMARK OFFICE
CERTIFICATE OF CORRECTION

PATENT NO.         : 9,093,717 B2
APPLICATION NO.    : 13/476843
DATED              : July 28, 2015
INVENTOR(S)        : Jeffrey Sakamoto et al.

It is certified that error appears in the above-identified patent and that said Letters Patent is hereby corrected as shown below:

In the specification

Col. 4/Line 51: reads as "polydroxyalcohol" and should read as "polyhydroxyalcohol"
Col. 7/Line 32: reads as "tetraganol" and should read as "tetragonal"
Col. 9/Line 5: reads as "zirconacene" and should read as "zirconocene"
Col. 9/Line 55: reads as "and or" and should read as "and/or"
Col. 20/Line 17: reads as "Diffactometer," and should read as "Diffractometer,"

Signed and Sealed this
Fifteenth Day of December, 2015

Michelle K. Lee
*Director of the United States Patent and Trademark Office*